United States Patent
Nagarajan et al.

(10) Patent No.: US 8,538,277 B2
(45) Date of Patent: Sep. 17, 2013

(54) COHERENT OPTICAL RECEIVER

(75) Inventors: Radhakrishnan L. Nagarajan, Cupertino, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 809 days.

(21) Appl. No.: 12/572,179

(22) Filed: Oct. 1, 2009

(65) Prior Publication Data
US 2010/0322628 A1    Dec. 23, 2010

Related U.S. Application Data

(60) Provisional application No. 61/219,725, filed on Jun. 23, 2009.

(51) Int. Cl.
    *H04B 10/06* (2011.01)
(52) U.S. Cl.
    USPC ............................................. 398/203
(58) Field of Classification Search
    USPC ............................................. 398/203
    See application file for complete search history.

(56) References Cited

U.S. PATENT DOCUMENTS

| | | | | |
|---|---|---|---|---|
| 7,936,999 | B1 * | 5/2011 | Hawryluck et al. | 398/206 |
| 2002/0106143 | A1 * | 8/2002 | Doerr et al. | 385/14 |
| 2003/0058504 | A1 * | 3/2003 | Cho et al. | 359/161 |
| 2003/0123496 | A1 * | 7/2003 | Broutin et al. | 372/20 |
| 2008/0038001 | A1 * | 2/2008 | Becker et al. | 398/204 |
| 2008/0267638 | A1 * | 10/2008 | Nakashima et al. | 398/208 |
| 2009/0022495 | A1 * | 1/2009 | Welch et al. | 398/79 |
| 2009/0324224 | A1 * | 12/2009 | Xie | 398/65 |
| 2010/0054761 | A1 * | 3/2010 | Chen et al. | 398/212 |

OTHER PUBLICATIONS

Zhou et al., "Electrically injected single-defect photonic bandgap surface-emitting laser at room temperature", Electronics Letters, vol. 36, No. 18, Aug. 2000.*

* cited by examiner

*Primary Examiner* — Shi K Li
(74) *Attorney, Agent, or Firm* — David L. Soltz

(57) ABSTRACT

A coherent optical receiver circuit is disclosed in which various components of the optical receiver may be provided or integrated, in one example, on a common substrate. Further integration is achieved by incorporating various optical demultiplexer designs that are relatively compact and conserve space on the surface of the substrate. The optical receiver circuit may be used to demultiplex quadrature phase shift keying (QPSK) optical signals.

16 Claims, 19 Drawing Sheets

Fig. 13

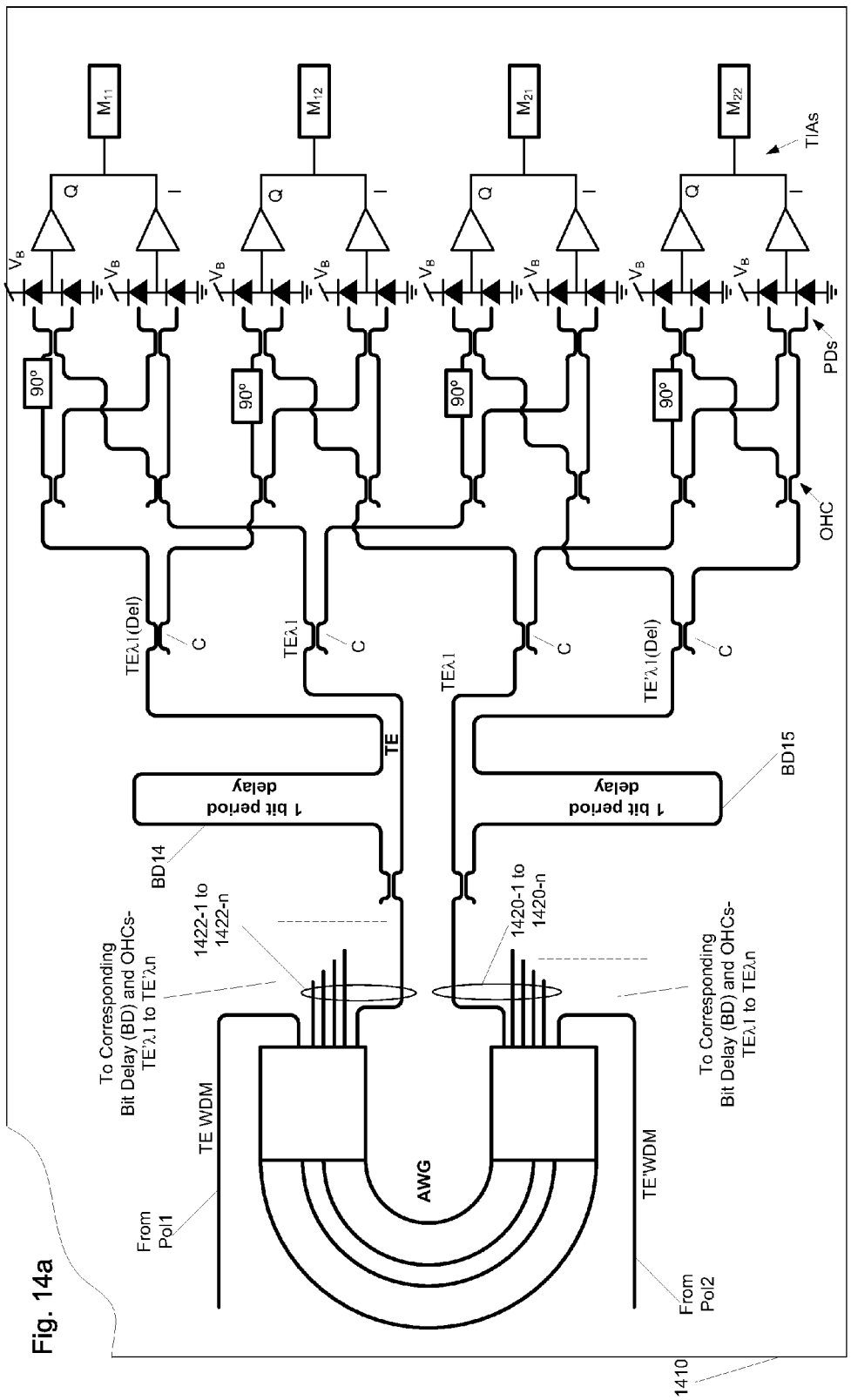

COHERENT OPTICAL RECEIVER

The present application claims the benefit of U.S. Provisional Application No. 61/219,725, filed Jun. 23, 2009, the entire contents of which are incorporated herein by reference.

BACKGROUND

Wavelength division multiplexed (WDM) optical communication systems are known in which multiple optical signals, each having a different wavelength, are combined onto a single optical fiber. Such systems typically include transmitters having a laser associated with each wavelength, a modulator configured to modulate the output of the laser, and an optical combiner to combine each of the modulated outputs. Receivers are also provided to demultiplex the received WDM signal into individual optical signals, convert the optical signals into electrical signals, and output the data carried by those electrical signals.

Conventionally, WDM systems have been constructed from discrete components. For example, demultiplexer and photodiodes have be packaged separately and provided on a printed circuit board. More recently, however, many WDM components, have been integrated onto a single chip, also referred to a photonic integrated circuit (PIC).

In order to further increase the data rates associated with WDM systems, various modulation formats have been proposed for generating the modulated optical output.

One such optical signal modulation format, known as polarization multiplexed differential quadrature phase-shift keying ("Pol Mux DQPSK"), can provide spectral densities with higher data rates per unit of fiber bandwidth than other modulation formats, such as on-off keying (OOK).

A receiver configured to decode and output the information carried by a Pol Muxed DQPSK signal is described in U.S. patent application Ser. Nos. 12/052,541; 12/345,817; and 12/345,824, the entire contents of each of which are incorporated herein by reference. In such systems, various components are provided on multiple substrates. There is a need, however, to provide such components of an optical receiver, which receives Pol Muxed DQPSK modulated optical signals or optical signals modulated in accordance with other modulation formats, on one substrate to improve reliability, simplify manufacturing, and reduce costs. There is also a need for integrated coherent optical receivers having a compact design.

SUMMARY

Consistent with the present disclosure, an apparatus is provided that comprises a local oscillator including a laser. The laser has a first side and a second side. The first side supplies first light and the second side supplies second light. Optical hybrid circuitry is also provided that is configured to receive the first and second light from the laser of the local oscillator. In addition, optical demultiplexing circuitry is provided that is configured to receive a wavelength division multiplexed (WDM) signal including a plurality of optical signals. The optical demultiplexing circuitry further includes a plurality of waveguides, each of which supplying a corresponding one of the plurality of optical signals. Each of the plurality of optical signals has a corresponding one of a plurality of wavelengths. The optical hybrid circuitry receives one of the plurality of optical signals from the optical demultiplexing circuitry. Further, a plurality of photodiodes is provided that is configured to receive optical outputs from the optical hybrid circuitry.

Consistent with a further aspect of the present disclosure, an apparatus is provided that comprises a local oscillator that includes a laser, which supplies light. An optical splitter is also provided that is configured to receive the light. The optical splitter has a first output configured to supply a first portion of the light and a second output configured to receive a second portion of the light. Optical hybrid circuitry is also provided that is configured to receive the first and second portions of the light from the laser of the local oscillator. In addition, optical demultiplexing circuitry is provided that is configured to receive a wavelength division multiplexed (WDM) signal including a plurality of optical signals. The optical demultiplexing circuitry further includes a plurality of waveguides, each of which supplying a corresponding one of the plurality of optical signals. Each of the plurality of optical signals has a corresponding one of a plurality of wavelengths. The optical hybrid circuitry receives one of the plurality of optical signals from the optical demultiplexing circuitry. A plurality of photodiodes is also provided that is configured to receive optical outputs from the optical hybrid circuitry.

It is to be understood that both the foregoing general description and the following detailed description are exemplary and explanatory only and are not restrictive of the invention, as claimed.

The accompanying drawings, which are incorporated in and constitute a part of this specification, together with the description, serve to explain the principles of the present disclosure.

BRIEF DESCRIPTION OF THE DRAWINGS

FIGS. 3-12 illustrate examples of optical demultiplexers consistent with

FIG. 13 illustrates an example of a receiver circuit consistent with an aspect of the present disclosure;

FIGS. 14*a*-14*e* illustrate additional examples of a receiver circuit consistent with an aspect of the present disclosure.

DESCRIPTION OF THE EMBODIMENTS

A coherent optical receiver circuit is disclosed in which various components of the optical receiver may be provided or integrated, in one example, on a common substrate. Further integration is achieved by incorporating various optical demultiplexer designs that are relatively compact and conserve space on the surface of the substrate. The optical receiver circuit may be used to demultiplex quadrature phase shift keying (QPSK) optical signals.

Reference will now be made in detail to the present exemplary embodiments, which are illustrated in the accompanying drawings.

Figure 1:
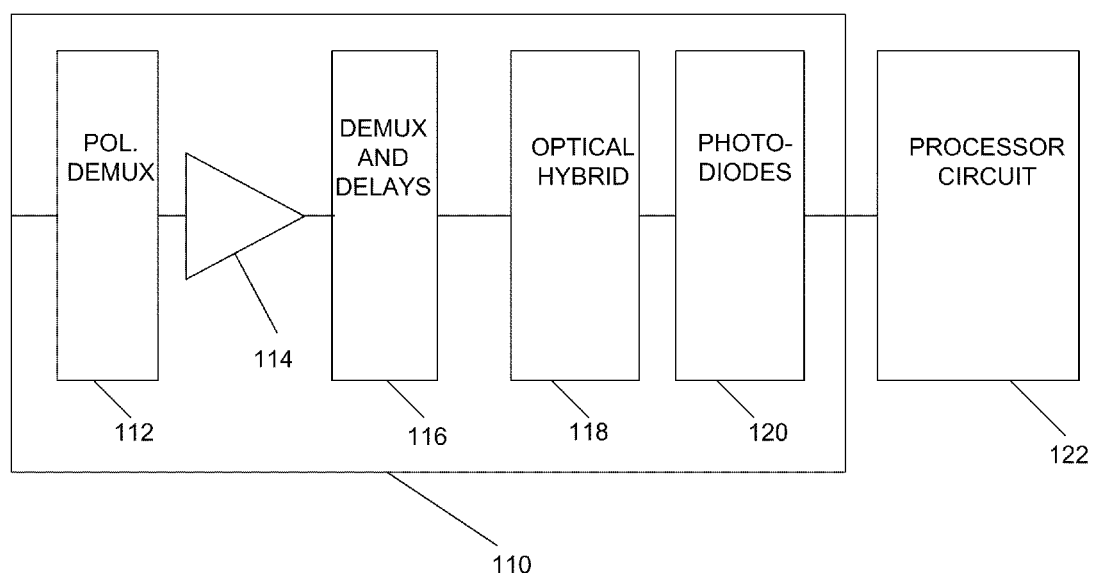
FIG. 1 is a block diagram of An optical receiver consistent with an aspect of the present disclosure.

FIG. 1 illustrates a block diagram of an optical receiver circuit 100 consistent with the present disclosure. Optical receiver circuit 100 includes polarization demultiplexer 112 provided on substrate 110. A Pol Muxed DQPSK wavelength division multiplexed (WDM) signal may be provided to polarization demultiplexer 112. The Pol Muxed DQPSK signal may include first optical signals, each of which having a first polarization (e.g., TE) and a corresponding one of wavelengths $\lambda 1$ to $\lambda n$, and second optical signals, each of which having a second polarization (e.g., TM) and a corresponding one of the wavelengths λ1 to λn. The first optical signals may be output from a first port of polarization demultiplexer 112 and the second optical signals may be output from a second port of polarization demultiplexer 112 (not shown in FIG. 1, but discussed in greater detail below). The first and second optical signals may be amplified by optical amplifiers 114 and supplied to demultiplexing and delay circuitry 116, which optically demultiplexes the received signals by wavelength (typically without conversion to electrical signals) and delays the optical signals relative to one another for further processing by known optical hybrid circuits 118. Optical hybrid circuits 120, in turn, provide additional optical signals to corresponding photodiodes 120. A processor circuit 122 receives and processes the electrical outputs from photodiodes 120 with multi-input-multiple-output (MIMO) circuitry, as described, for example, in the above-noted U.S. patent application Ser. No. 12/052,541. The electrical outputs from processor circuit 122 may be supplied to clock and data recovery circuitry and forward error correction (FEC) decoding circuitry (not shown).

Figure 2:
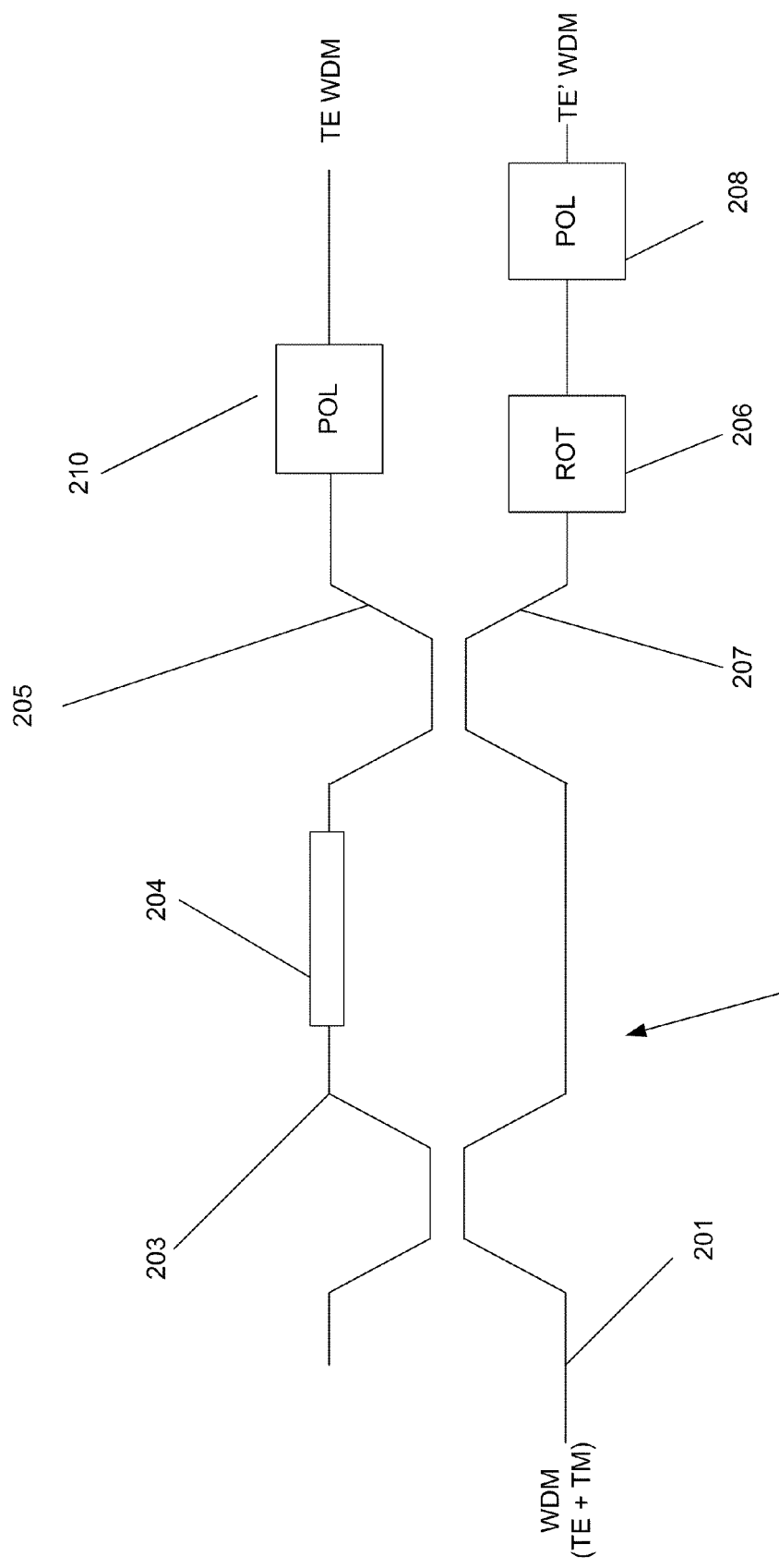
FIG. 2 illustrates a polarization beam splitter and polarizers consistent with an additional aspect of the present disclosure.

Polarization demultiplexer 112 will next be described with reference to FIG. 2. Polarization demultiplexer 112 includes a polarization splitter, also referred to as a polarization beam splitter (PBS) 202, as described, for example, in Soldano et al., "Mach-Zehnder Interferometer Polarization Splitter in InGaAsP/InP", IEEE Photonics Technology Letters, vol. 6, no. 3, March 1994, pp. 402-405, the entire contents of which are incorporated herein by reference. PBS 202 may constitute a Mach-Zehnder interferometer including an input waveguide 201, and a branch waveguide 203 having one or more layers of metal or other materials that affect the index of light having either a TM ("transverse magnetic") polarization or a TE ("transverse electric") polarization. Typically, a WDM signal including first and second optical signals having TE and TM polarizations, polarizations, may be supplied to PBS 202 via input waveguide 201. Those optical signals (first optical signals) having a TE polarization (TE WDM) may be output from a port or waveguide 205 coupled to polarizer 210 and those having a TM polarization (TM WDM) may be output from a port of waveguide 207 coupled to polarizer 208. Preferably, each of first optical signals within TE WDM has a corresponding one of a set of wavelengths (λ1 to λn), and each second optical signals within TM WDM has a corresponding of the same set of wavelengths. The set of wavelengths is the same set of wavelengths associated with the WDM signal input to polarization demultiplexer 112.

A known polarizer 210 may receive the first TE polarized optical signals, for example, and may be configured to block or filter any extraneous or residual light that does not have the TE polarization. As a result, a TE WDM signal including the first optical signals is output from polarizer 210. In addition, a known optical rotator 206 may be provided to rotate the polarization of the second optical signals output from waveguide 207 so that the second optical signals have a TE polarization, for example. A known polarizer 208 may be further provided to filter or block any extraneous or residual light output from 206 that does not have the TE polarization. The polarization-rotated second optical signals, labeled TE'WDM in FIG. 2, are output from polarizer 208.

Although FIG. 1 illustrates polarization demultiplexer 112 provided on the same substrate as, for example, amplifiers 114, demultiplexer and delay circuitry 116, optical hybrid circuitry 118, and photodiodes 120, it is understood that polarization demultiplexer 112 may be provided on a separate substrate from substrate 110. In that case, polarization maintaining fibers may be used to supply optical signals TE WDM and TM WDM to amplifiers 114 and other components on substrate 110.

Figure 3:
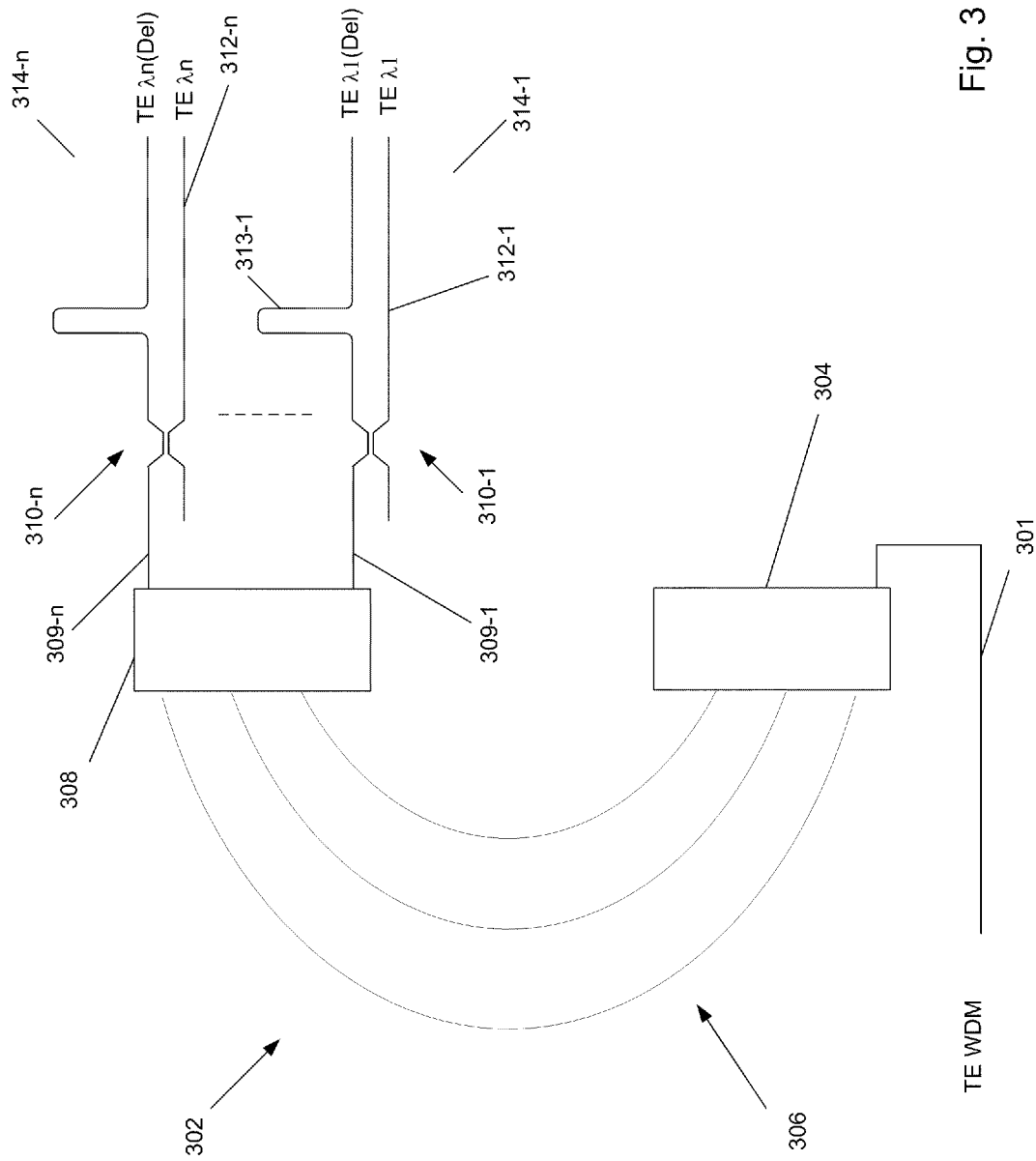
Figure 4:
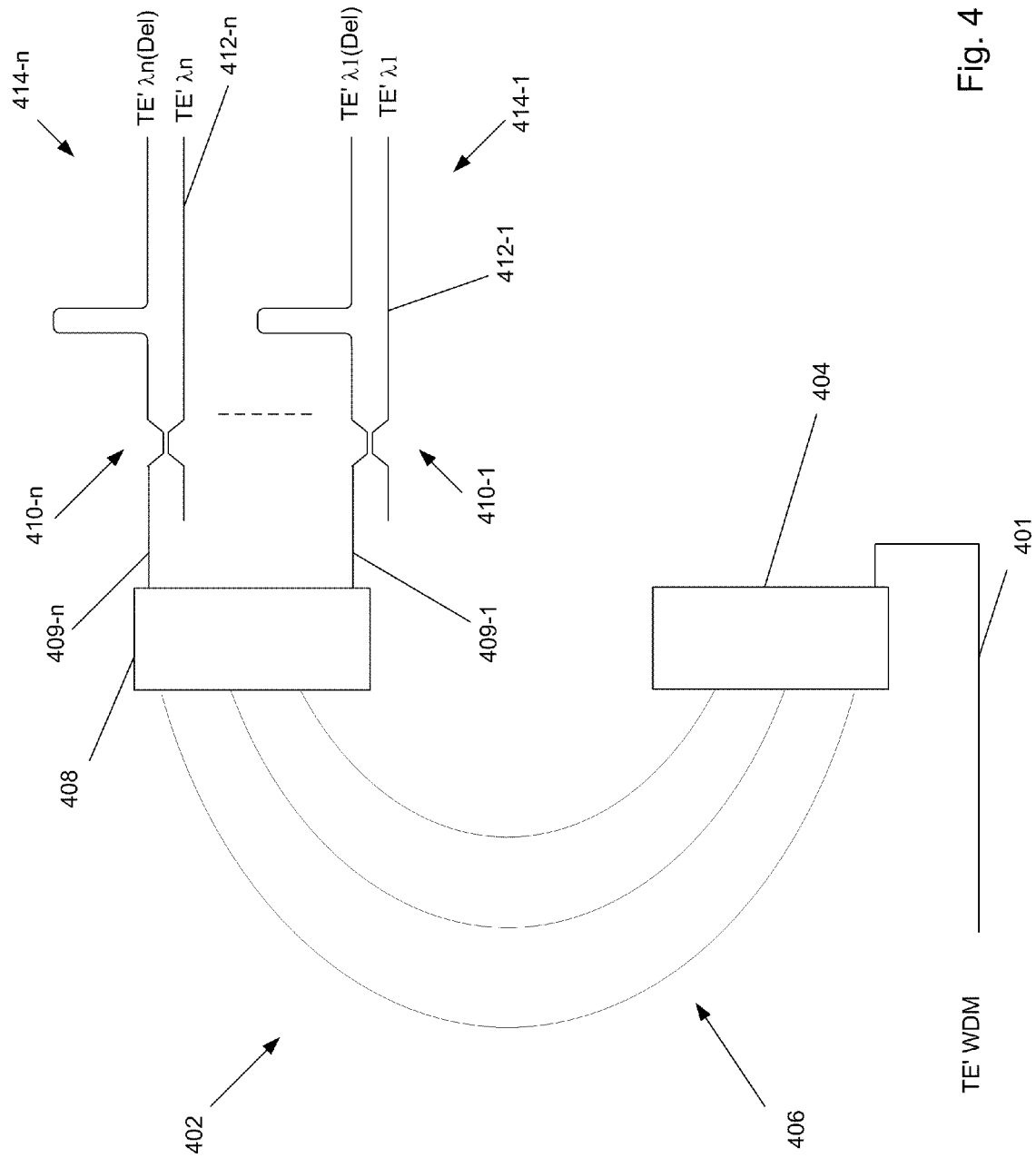

FIGS. 3 and 4 illustrate examples of optical demultiplexing and delay circuitry 300 and 400 with may be included in circuitry 116 in accordance with an example of the present disclosure. Such circuitry may both be provided on substrate 110 and each may include a corresponding optical demultiplexer, such as an arrayed waveguide grating (AWG) 302, 402. In FIG. 3, optical signals TE WDM output from polarization demultiplexer 112 are supplied to an input waveguide 301 of AWG 302. AWG 302 includes free space or slab waveguides ("slabs") 304 and 308 with a plurality of waveguides 306 connected there between. In addition, a plurality of output waveguides 309-1 to 309-n extend from slab 308. As generally understood, AWG 302 may be configured such that each optical signal included in the TE WDM signal is output on a corresponding one of output waveguides 309-1 to 309-n. Each optical signal has, in this example, a TE polarization and a corresponding one of the set of wavelengths λ1 to λn (optical signals TE λ1 to TE λn). Also, each optical signal is supplied to a corresponding one of a plurality of optical splitters or power splitter 310-1 to 310-n (collective referred to as splitters 310). Each splitter 310 outputs a first portion of a received optical signal on a corresponding one of waveguides 312-1 to 312-n and a second portion to a corresponding one of optical delay circuits 314-1 to 314-n. In the example, shown in FIG. 3, each of delay circuits 314-1 to 314-n may include a delay interferometer, which includes an additional waveguide segment, e.g., waveguide segment 313-1 in delay circuit 314-1, such that optical signals passing through the delay interferometer traverse a longer optical path than those output on corresponding waveguide 312-1. Thus, optical signals propagating through delay circuits 314-1 to 314-n (TE λ1(Del) to TE λn λDel)) are delayed versions of TE λ1 to TE λn, i.e., TE λ1 (Del) to TE λn (Del) are delayed relative to TE λ1 to TE λn, respectively. Other known delay circuits may also be provided instead of the delay interferometers discussed above.

Preferably, each of optical signals TE λ1 to TE λn carry a series of bits, such that each bit is transmitted over a period of time referred to as a bit period. In one example, the amount of delay associated with each delay circuit 414-1 to 414-n is substantially equal to the bit period.

In the example shown in FIG. 3, each of splitters 410-1 to 410-n includes a coupler. However, it is understood that in this example, as well as the other examples discussed herein, other known power splitters may be provided instead of the couplers discussed above.

The second optical signals (TE' WDM discussed above in connection with FIG. 2) are output from polarization demultiplexer 112 and are demultiplexed, as well as power split into two portions that are delayed relative to one another by circuitry shown in FIG. 4. The circuitry shown in FIG. 4 includes similar components that operate in a similar fashion as those components discussed above in regard to circuitry 300. Namely, input waveguide 401, AWG 402 (including slabs 404 and 408 and waveguides 406), output waveguides 409-1 to 409-n, splitters 410-1 to 410-n, waveguides 412-1 to 412-n, and optical delay circuits (e.g., delay interferometers) 414-1 to 414-n operate to output optical signal portions TE' λ1 to TE' λn (each having a corresponding one of wavelengths λ1 to λn) and delayed versions of these optical signal portions as TE' λ1 (Del) to TE' λn (Del). Here also, the delay associated with each of circuits 414-1 to 414-n is substantially equal to a bit period, such that each of TE' λ1 (Del) to TE' λn (Del) is delayed relative to TE' λ1 to TE' λn, respectively, by this amount.

As noted above, receiver 100 may be used to receive Pol Muxed DQPSK optical signals, in which information is encoded by varying the phase of such signals. Accordingly, in order to decode such signals, a phase reference is preferably provided at the receiver. The delayed signals (TE λ1 (Del) to TE λn (Del) and TE' λ1 (Del) to TE' λn (Del) discussed above may provide such a reference, which, along, with the non-delayed signals TE λ1 to TE λn and TE' λ1 to TE' λn are supplied to optical hybrid circuits 120.

Figure 5:
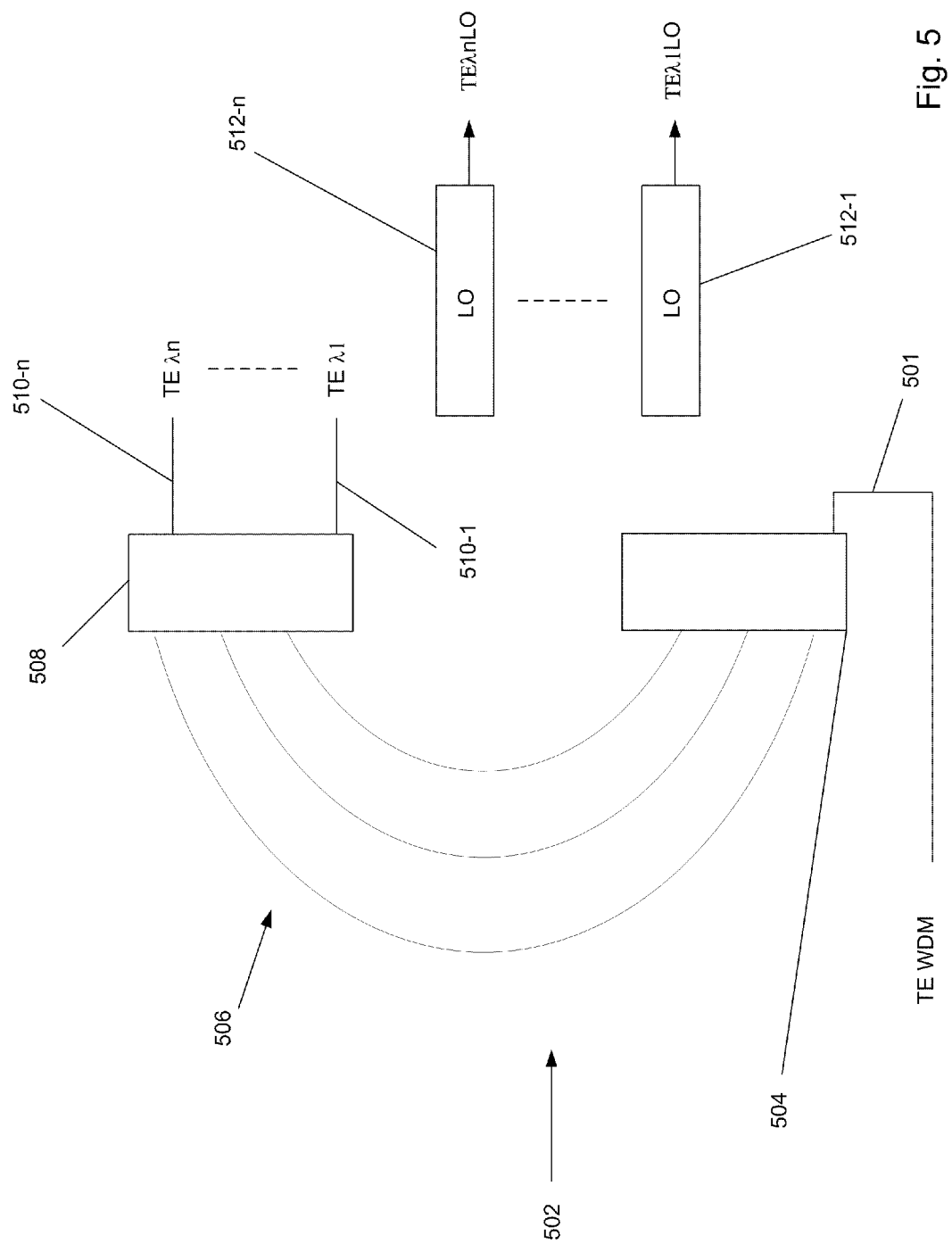

Alternatively, as shown in FIG. 5, a plurality of lasers 512-1 to 512-n may be provided as local oscillators that generate phase reference optical signals TEλ1 LO to TE λnLO to realize a coherent receiver or detector that receives optical signals modulated in accordance with a quadrature phase shift-keying (QPSK) modulation format. As further shown in FIG. 5, signal TE WDM may be supplied to AWG 502, which includes slabs 504 and 508 and waveguides 506. Output waveguides 510-1 to 510-n supply each of a corresponding one of optical signals TE λ1 to TE λn. These optical signals, along with reference signals TEλ1 LO to TE λnLO, are supplied to optical hybrid circuits 118 for further processing. In a similar fashion, optical signal TE' WDM is demultiplexed by an AWG (not shown) and the demultiplexed optical signals TE' λ1 to TE' λn are also supplied to optical hybrid circuits 120. Optionally, a portion of the outputs of lasers 512-1 to 512-n may be rotated and also supplied to optical hybrid circuits 118 as reference signals associated with TE' λ1 to TE' λn. Lasers 512-1 to 512-n may be provided on the same substrate as AWG 502. Additional examples of coherent receivers consistent with the present disclosure are discussed below in connection with FIGS. 14b and 14c.

Figure 6:
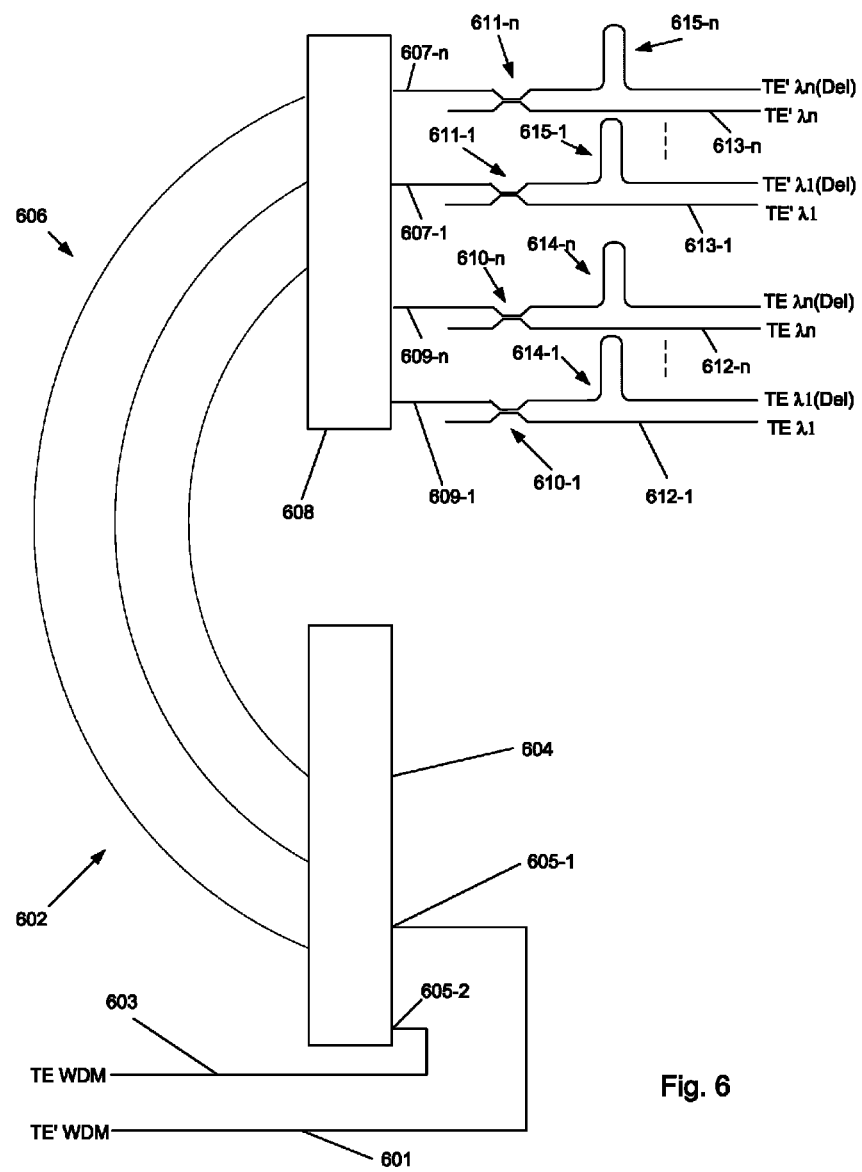

FIG. 6 illustrates an example of demultiplexing and delay circuitry that may be used to supply optical signals TE λ1 to TE λn, TE' λ1 to TE' λn, TE λ1(Del) to TE λn(Del), and TE' λ1(Del) to TE' λn(Del) with one AWG (AWG 602). In the example shown in FIG. 6, input waveguides 601 and 603 supply signals TE' WDM and TE WDM, respectively, from polarization demultiplexer 112 to first (input) slab 604 of waveguide 602. AWG 602 includes waveguides 606, similar to those discussed above, as well as a second (output) slab 608.

As generally understood, the location along an input slab at which optical signals are input to the AWG determines the locations at which the demultiplexed optical signals are output from the AWG. Thus, although TE WDM and TE' WDM include optical signals having the same wavelengths, since both are input to AWG 602 at different locations along slab 604, the demultiplexed optical signals associated with TE WDM (TE λ1 to TE λn) are output at different locations along slab 608 than the optical signals associated with TE' WDM (TE' λ1 to TE' λn). Accordingly, AWG 602 may be configured to demultiplex both TE WDM and TE' WDM.

Thus, as further shown in FIG. 6, the TE WDM signal is input to AWG 602 at location 605-1 and the TE' WDM signal is input to AWG 602 at location 605-2. As a result, demultiplexed optical signals TE λ1 to TE λn are output on waveguides 609-1 to 609-n, respectively, and TE' λ1 to TE' λn are output on waveguides 607-1 to 607-n, respectively. Each of waveguides 607-1 to 607-n extends from slab 608 and supplies a corresponding one of optical signals TE' λ1 to TE' λn, and each of waveguides 609-1 to 609-n supplies a corresponding one of optical signals TE λ1 to TE λn. Each of optical signals TE' λ1 to TE' λn are supplied to a corresponding one of splitters 611-1 to 611-n, and each of optical signals TE λ1 to TE λn are fed to a corresponding one of optical splitters 610-1 to 610-n. Each of splitters 610-1 to 610-n has a first output connected to a corresponding one of optical delay circuits 614-1 to 614-n to supply optical signals TE λ1(Del) to TE λn(Del) and a second output connected to a corresponding one of the waveguides 612-1 to 612-n to supply optical signals TE λ1 to TE λn. Likewise, each of splitters 611-1 to 611-n has a first output connected to a corresponding one of optical delay circuits 615-1 to 615-n to supply optical signals TE' λ1(Del) to TE' λn(Del) and a second output connected to a corresponding one of the waveguides 613-1 to 613-n to supply optical signals TE' λ1 to TE' λn.

Figure 7:
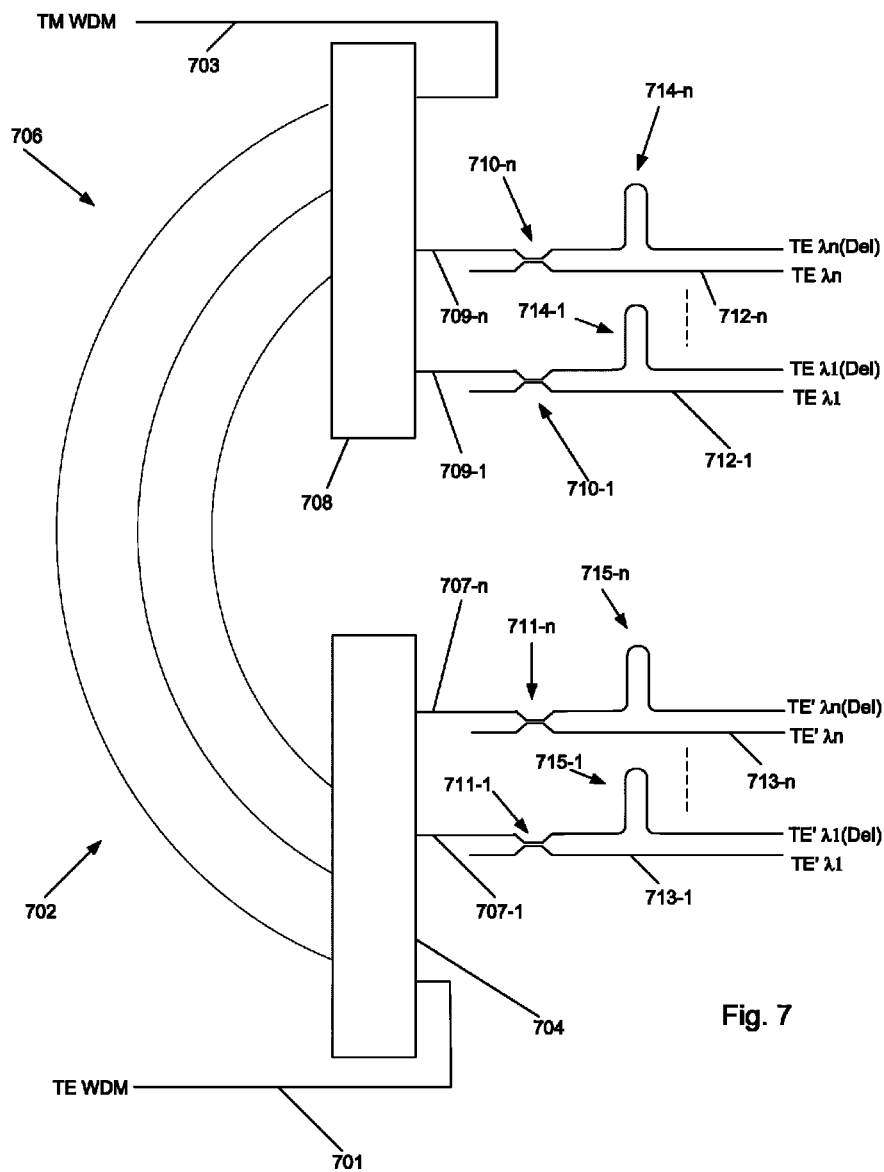

FIG. 7 illustrates another example in which optical signal TE WDM is fed to one slab (704) of AWG 702 (including waveguides 706) and the corresponding demultiplexed optical signals (TE λ1 to TE λn) are output from the opposite slab (708). In a similar fashion, TE' WDM is fed to slab 708 and the corresponding demultiplexed optical signals TE' λ1 to TE' λn are output from the opposite slab 704. Thus, in FIG. 7, TE WDM and TE' WDM are fed to opposite slabs, whereas, in FIG. 6, these signals were supplied to the same slab.

Namely, each of demultiplexed optical signals TE λ1 to TE λn (included in signal TE WDM) is output on a corresponding one of waveguides 709-1 to 709-n extending from slab 708 (opposite slab 704), and each of demultiplexed optical signals TE' λ1 to TE' λn (included in signal TE' WDM) is output on a corresponding one of waveguides 707-1 to 707-n extending from slab 704 (opposite slab 704). Splitters 710-1 to 710-n and 711-1 to 711-n; waveguides 712-1 to 712-n and 713-1 to 713-n; and optical delay circuits 714-1 to 714-n are configured in a manner similar to that described above in connection with the splitters, waveguides and delay circuits shown in FIG. 6. As in the example illustrated in FIG. 6, the circuitry shown in FIG. 7 outputs optical signals TE λ1 to TE λn; TE' λ1 to TE' λn; TE λ1(Del) to TE λn(Del); and TE' λ1(Del) to TE' λn(Del).

FIGS. 8-11 illustrate additional examples of optical demultiplexer and delay circuitry wherein the WDM signals are power split and delayed prior to demultiplexing. An advantage of the circuits shown in FIGS. 8-11 is that fewer delay circuits are required compared to the circuitry discussed above in connection with FIGS. 3-7. Since delay circuits are relatively large, the circuitry shown in FIGS. 8-11 may be reduced in size relative to the circuitry shown in FIGS. 3-7.

Figure 8:
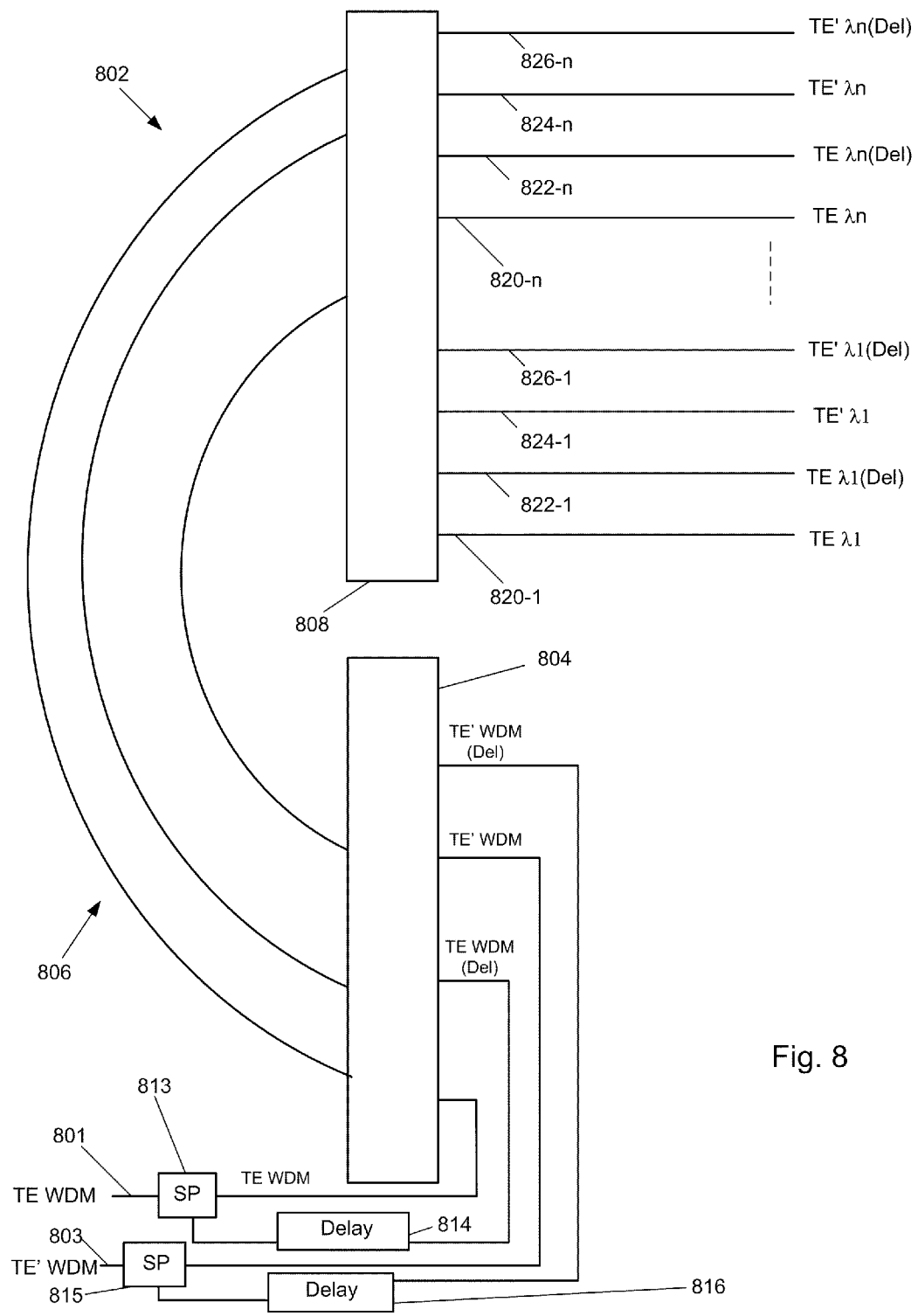

In the example shown in FIG. 8, waveguides 801 and 803 receive optical signals TE WDM and TE' WDM, respectively. Splitter 81, which may have a structure similar to the splitters discussed above, is coupled to waveguide 801 and supplies a first portion to slab 804 of AWG 802, which includes waveguides 806. A second portion of the TE WDM signal is supplied to delay circuit 814, which may have a delay interferometer similar to that discussed above. As further noted above, the delay interferometer may delay the TE WDM signal by a bit period, for example. The non-delayed output of splitter 813 and the output of delay circuit 814 are both supplied to slab 804 of AWG 802.

Splitter 815 may have a structure similar to that described above to split the incoming TE' WDM signal into two portions: a first portion that is supplied directly to slab 804; and a second portion that is delayed by delay circuit 816 (including a delay interferometer, for example), typically by a bit period.

The delayed and non-delayed portions of TE WDM and TE' WDM are demultiplexed by AWG 802, such that each of optical signals TE λ1 to TE λn are output on a corresponding one of output waveguides 820-1 to 820-n; each of optical signals TE' λ1 to TE' λn are output on a corresponding one of output waveguides 824-1 to 824-n; each of optical signals TE λ1(Del) to TE λn(Del) are output on a corresponding one output waveguides 822-1 to 822-n; and each of optical signals TE' λ1(Del) to TE' λn(Del) are output on a corresponding one of output waveguides 826-1 to 826-n.

In the configuration shown in FIG. 8, AWG 802 may have a relatively large number of outputs waveguides, which may require that the size of AWG 802 may be relatively large.

Figure 9:
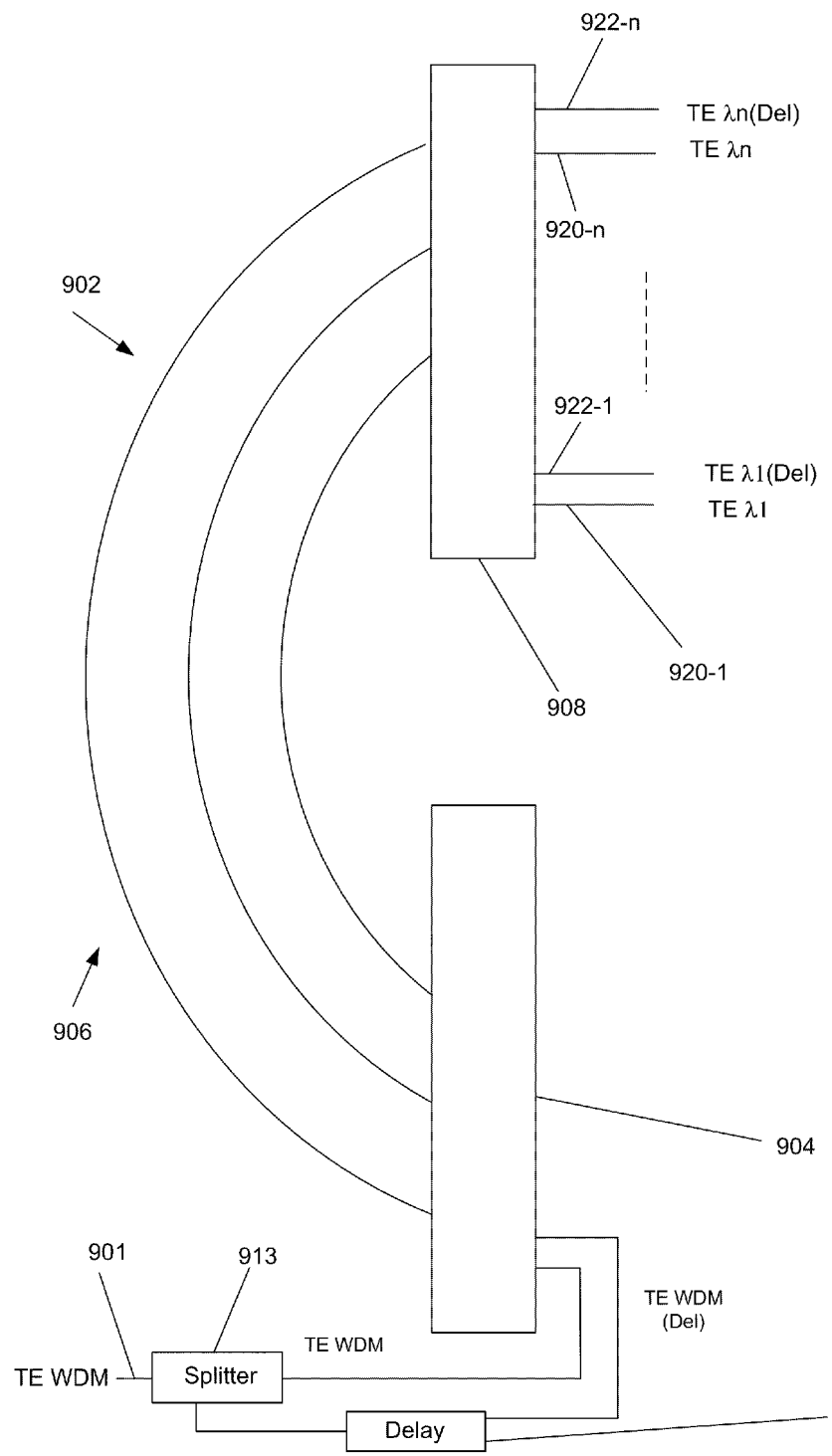
Figure 10:
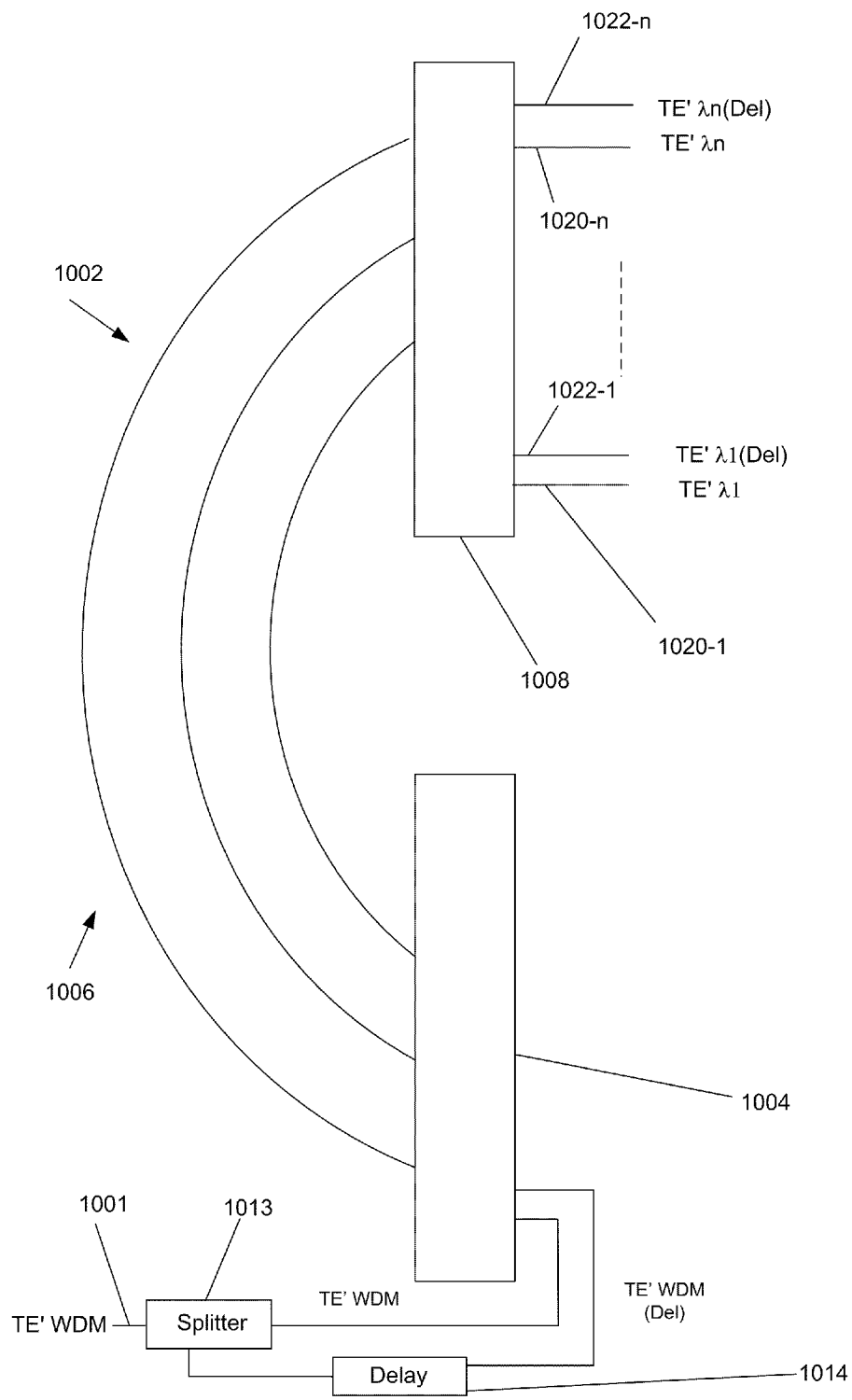

FIGS. 9 and 10 illustrate another example of demultiplexing and delay circuitry 116 in which delayed and non-delayed portions of TE WDM are demultiplexed by a first AWG (902) and delayed and non-delayed portions of TE' WDM are demultiplexed by a second AWG (1002). Both AWGs 902 and 1002 may be provided on the same substrate, e.g., substrate 110, which may include InP, for example.

In FIG. 9, TE WDM is supplied on an input waveguide 901 to splitter 913, which is similar to the splitters discussed above. Splitter 913 supplies a first portion of TE WDM to slab 904 and a second portion to delay circuit 914 (similar to the delay circuits discussed above), which delays the second portion, typically, by a bit period. The delayed second portion is also supplied to slab 904. AWG 902, which includes additional waveguides 906, demultiplexes the optical signals that constitute the first portion an the delayed second portion of TE WDM, such that each of TE λ1 to TE λn is output on a corresponding one of waveguides 920-1 to 920-n, and each of TE λ1(Del) to TE λn(Del) is output on a corresponding one of waveguides 922-1 to 922-n.

The delay and demultiplexing circuit shown in FIG. 10 also includes an input waveguide 1001, splitter 1013, delay circuit 1014, AWG 1002 (including waveguides 1006 and slabs 1004 and 1008), and output waveguides 1020-1 to 1020-n and 1022-1 to 1022-n. The circuitry shown in FIG. 10 operates in a similar fashion as that shown in FIG. 9 to supply optical signals TE' λ1 to TE' λn and TE' λ1(Del) to TE' λn(Del).

In the examples shown in FIGS. 9 and 10, the first and delayed second portions of the incoming WDM signals are supplied to the same AWG slab. In the examples shown in FIGS. 11 and 12, however, the first and second WDM portions are supplied to opposite slabs, and, as a result, the demultiplexed optical signals are output from different slabs.

Figure 11:
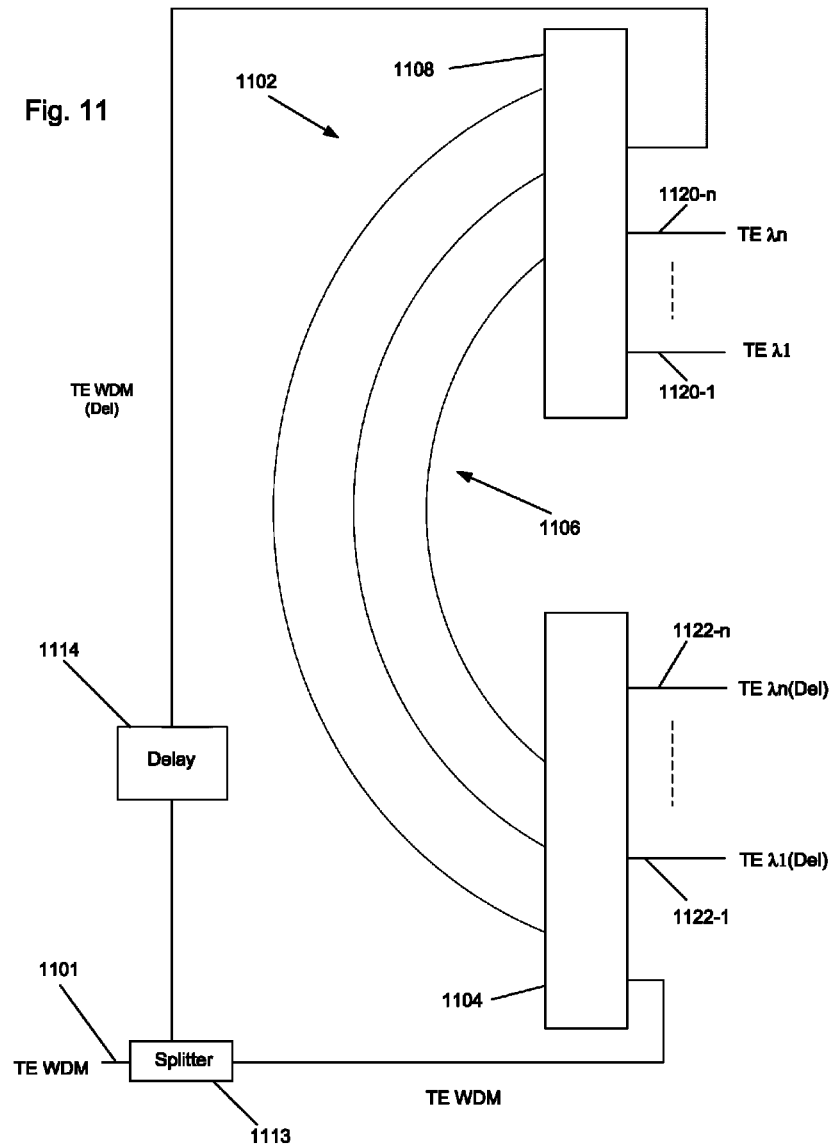

For example, as shown in FIG. 11, TE WDM is supplied on waveguide 1101 to splitter 1113 (similar to the splitters discussed above), which supplies a first portion to of TE WDM to slab 1104 and a second portion to delay circuit 1114 (having a structure similar to of the delay circuits described above). Delay circuit 1114 typically delays the second portion of TE WDM by a bit period relative to the non-delayed first portion and supplies the delayed second portion to slab 1108 opposite slab 1104. As a result, each of the optical signals that constitute non-delayed first portion of TE WDM (TE λ1 to TE λn) is demultiplexed by AWG 1102 and output on a corresponding one of waveguides 1120-1 to 1120-n, and each of the optical signals that constitute the delayed second portion of TE WDM (TE λ1(Del) to TE λn(Del)) is output on a corresponding one of waveguides 1122-1 to 1122-n.

Figure 12:
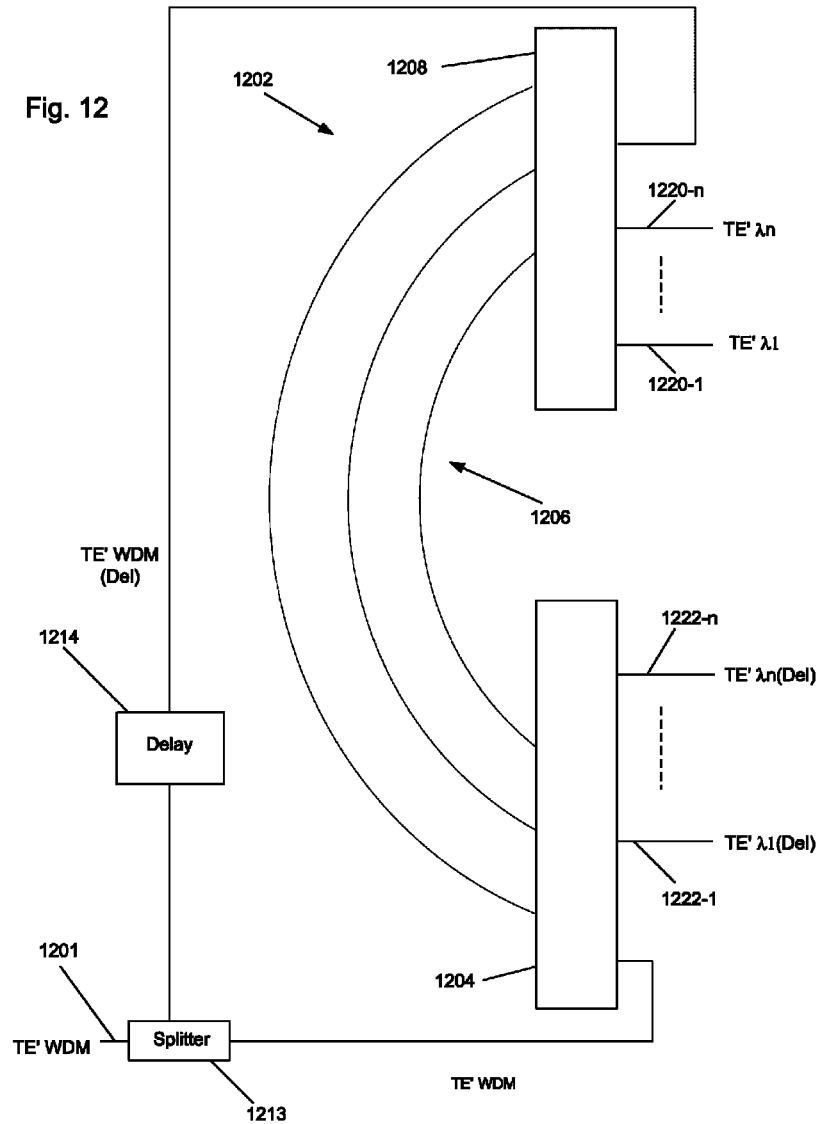

The circuitry shown in FIG. 12 (waveguide 1201, splitter 1213, delay circuit 1214, AWG 1202 including waveguides 1206 and slab 1204 and 1208), waveguides 120-1 to 1220-n, and waveguides 1222-1 to 1222-n) is similar to that shown in FIG. 11 and operates to supply optical signals TE λ1 to TE λn, TE' λ1 to TE' λn, and their delayed versions in a manner similar to that discussed above in regard to FIG. 11.

Figure 13:
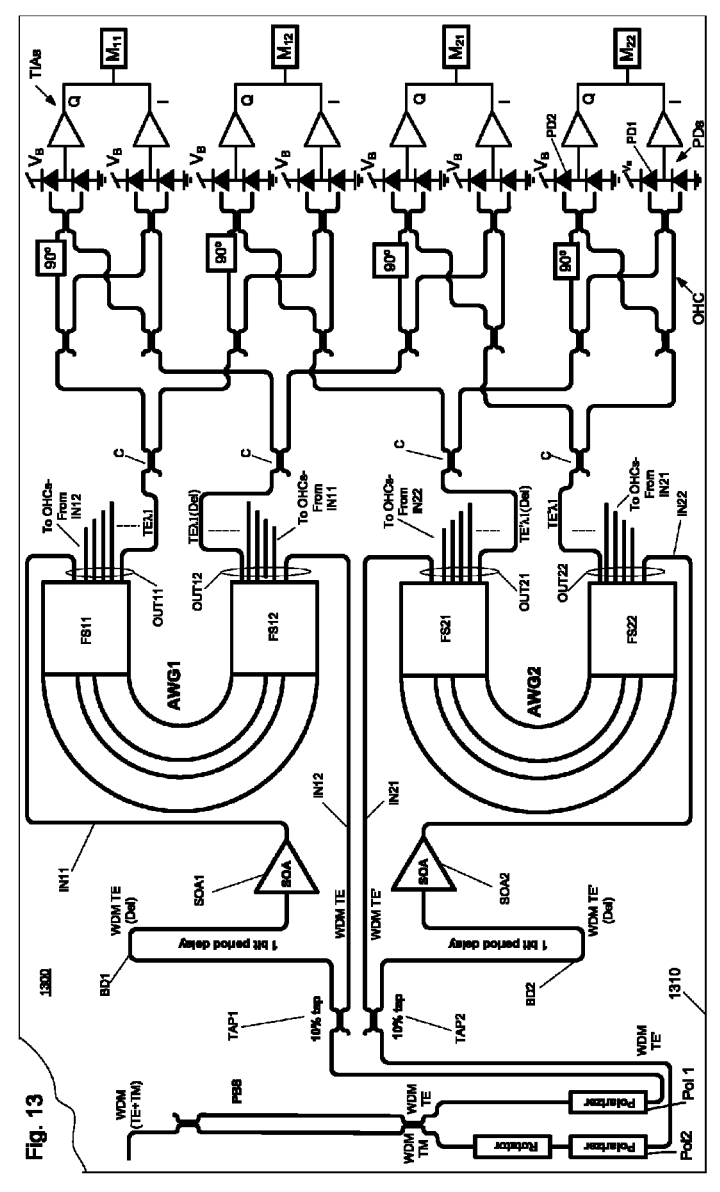

FIG. 13 is a detailed diagram of an exemplary receiver circuit 1300 incorporating the optical demultiplexing and delay circuitry shown in FIGS. 11 and 12. Receiver circuit 1300 may be provided or integrated on a substrate 1310, which may include indium phosphide (InP), for example. Receiver circuit 1300 includes a polarization beam splitter (PBS) that receives an incoming WDM signal including a plurality of optical signals, each at a corresponding one of a plurality of wavelengths. As discussed above in connection with FIG. 2, the PBS may have two outputs, which supply a first portion of the WDM signal (TE WDM) to a polarizer Pol1 and a second portion of the WDM signal (TM WDM) to a rotator and polarizer Pol2. Typically, as noted above, the first optical signals that constitute the first portion of the WDM signal have a first polarization, e.g., a TE polarization, and the second optical signals that constitute the second portion of the WDM signal have a second polarization, e.g., a TM polarization.

As further noted above in connection with FIG. 2, after passing through the rotator and polarizer (P2), the polarization of each of the second optical signals in TM WDM is rotated so that each has a TE polarization. Accordingly, the second optical signals are designated TE' WDM in FIG. 13, as in the above discussion in connection with FIG. 2.

The first WDM signal portion TE WDM is supplied to an optical coupler, splitter or tap TAP1, which power splits TE WDM a first part, which may have less power (e.g., 10% of the light input to tap TAP1) than a second part that is supplied directly to input IN12 of arrayed waveguide grating AWG1. The first part of TE WDM is fed to a delay waveguide BD1 that introduces a delay which is typically equal to one bit period. The delayed signals (WDM TE (Del)) may then be amplified by an optional semiconductor optical amplifier SOA1 and then fed to input waveguide IN11, which extends from free space region or slab waveguide FS11 of AWG1. AWG1 is configured to demultiplex WDM TE(Del), such that each wavelength component (e.g., TE λ1(Del)) thereof is output on a corresponding of waveguides OUT12. AWG1 is further configured such that each wavelength component (e.g., TE λ1) of the second part of the first WDM signal portion (WDM TE) supplied to input IN12 is output on each of waveguides OUT12. In the example shown in FIG. 13, each optical signal output from AWG1 typically has a TE polarization, as noted above connection with FIG. 11.

In a similar fashion, the second WDM signal portion WDM TE' (output form polarizer Pol2) is split by coupler or tap Tap2. A first part of WDM TE' (Del) is then delayed by delay waveguide BD2, amplified by semiconductor optical amplifier SOA2, and supplied to input IN21 extending to free space region FS21 of AWG2. A second part of the second WDM signal portion (WDM TE') is fed to input IN22 of AWG2. In the example shown in FIG. 13, WDM TE'(Del) is demultiplexed into optical signals (wavelength components, such as TE' λ1(Del)) that are output on waveguides OUT21 and the second part of the second WDM signal, TE' WDM, is demultiplexed into further optical signals (e.g., TE' λ1) that are output on waveguides OUT22.

As further shown in FIG. 13, the demultiplexed optical signals from AWG1 and AWG2 are next fed to 90 degree optical hybrid circuits (OHCs), which are known circuits that output sums of the input optical signals themselves, as well as the sums of the input signals and phase shifted, e.g., by 90 degrees, versions of the input signals. As generally understood, the polarization states of the optical signals supplied to each OHC are preferably be the same in order to insure that the data carried by the optical signals is adequately detected. Accordingly, as noted above, optical signals in WDM TM are rotated, for example, so that each of the optical signals supplied to the optical hybrid circuits OHCs typically have the same polarization, e.g., a TE polarization.

Photodiodes PDs convert the received optical output from optical hybrid circuits OHCs to corresponding electrical signals. Photodiodes PDs may be arranged in pairs, such as PD1 and PD2, and connected to one another in a balanced configuration. The output of each balanced pair (PD1 and PD2) supplies one of a quadrature (Q) or in-phase (I) electrical signal, which is amplified by one of transimpedance amplifiers (TIAs) and the amplified Q and I signals are combined and fed to multiple-input-multiple-output (MIMO) circuits M11, M12, M21, and M22, examples of which are described in the above-noted U.S. patent application Ser. No. 12/052,541. It is understood that the OHCs, PDs, and TIAs shown in FIG. 13 are provided to receive and process optical signals at a given wavelength. Optical signals at other wavelengths that are output from AWG1 and AWG2 are received by OHCs, PDs, and TIAs having a structure similar to that shown in FIG. 13.

Receiver 1300 has a relatively compact design, since AWGs 1 and 2 are configured to both receive and output optical signals through slab waveguides or free space regions (FS11, FS12, FS21, and FS22). Moreover, each of the above-noted components may be provided on substrate 1310.

FIG. 14a shows an embodiment similar to that shown in FIG. 13, except that each of a plurality of delay circuits (e.g., BD 14 and BD15) is provided for a corresponding one of outputs of AWG 1405. Although one AWG may be provided in the example shown in FIG. 14, a delay circuit is provided for each AWG output (e.g., 1420-1 to 1420-n and 1422-1 to 1422-n), as discussed above in connection with FIG. 7.

Figure 14B:
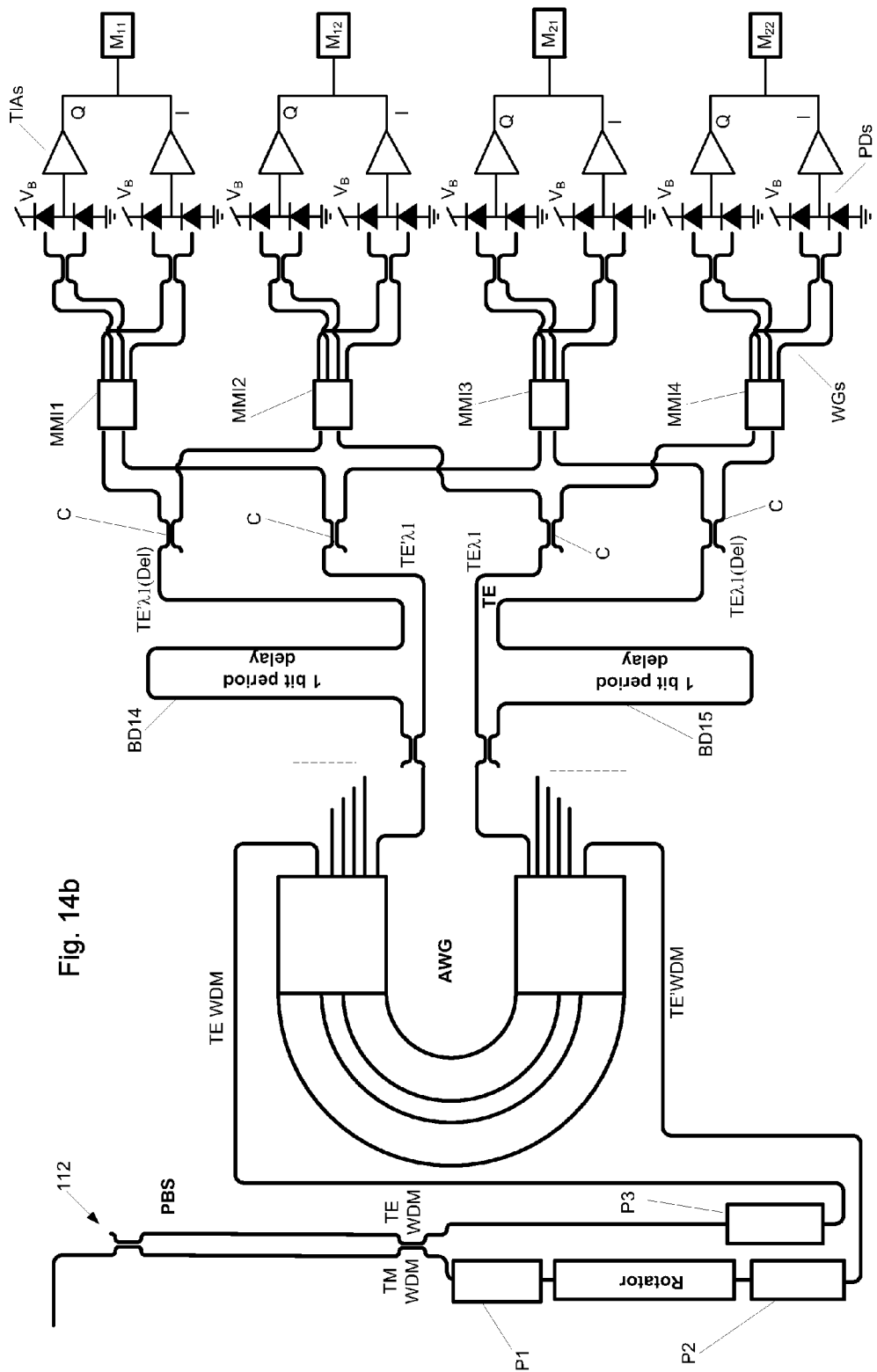

FIG. 14b illustrates an example similar to that shown in FIG. 14a. In the example shown in FIG. 14b, however, alternative polarization demultiplexing circuitry 112 is shown as including a polarization beam splitter (PBS) and rotator. In addition, first, second, and third polarizers P1, P2, and P3 are provided instead of two, as noted above in connection with FIGS. 2 and 13. As further shown in FIG. 14b, optical signals TM WDM and TE WDM are output from first and second outputs, respectively, from the PBS. A first polarizer acts as a filter to pass light having a TM polarization, but blocks light having other polarizations, such as a TE polarization. The rotator then rotates the light output from polarizer P1, so that such light has a TE polarization. A second polarizer P2 is provided to filter light having a polarization other than the TE polarization, and thus the optical signals in TM WDM are each output to the demultiplexing circuitry, which may be an AWG, as shown in FIG. 14b, with a TE polarization and are so designated TE' WDM. A third polarizer P3 is configured to pass light having a TE polarization, and may be included to block light at other polarizations that may be output with TE WDM from the polarization beam splitter. In FIG. 14b, each of the polarized optical signals in TE WDM and TM WDM (and TE' WDM) may be modulated in accordance with a differential quadrature phase shift-keying (DQPSK) format.

Further in FIG. 14b, the waveguides of the optical hybrid circuits OHCs shown in FIG. 14a are replaced by multi-mode interference (MMI) couplers MMI1 to MMI4. The outputs of MMI couplers MMI1 to MMI4 are next fed to photodiodes PD in a manner similar to that discussed above.

Figure 14C:
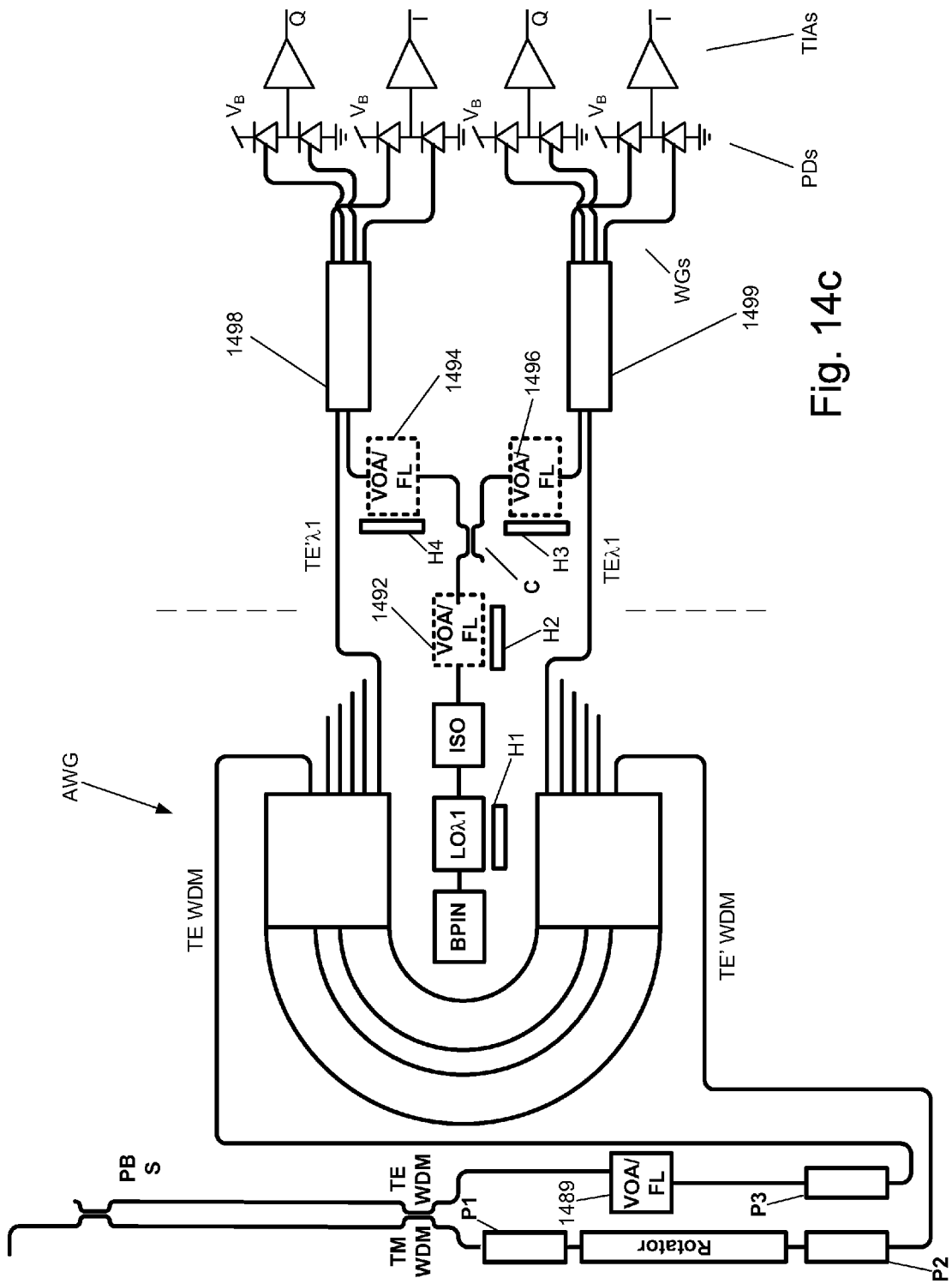

FIG. 14c illustrates another example including the polarization demultiplexer shown in FIG. 14b. In FIG. 14c, however, delay circuits, such as BD14 and BD15, are omitted. Instead a plurality of local oscillators, similar to those discussed above in connection with FIG. 5, are provided so that a coherent receiver can be realized. One such local oscillator is shown including laser LOλ1, which outputs light at wavelength λ1. LOλ1 may include a photonic bandgap laser, such as a distributed feedback (DFB) laser. Typically, local oscillator laser LOλ1 may operate at a relatively high power so that the light output therefrom is within a relatively narrow spectral range or has a relatively narrow line width. Accordingly, light output from LOλ1 may be passed through an optional optical isolator ISO and a variable optical attenuator or fixed loss (FL) element 1492 (such as a power splitter or tap) and then fed to splitter or coupler C. A first output of coupler C supplies a first portion of the light from local oscillator LOλ1 to a first MMI coupler 1498 and a second output of coupler C supplies a second portion of the light from local oscillator LOλ1 to a second MMI coupler 1499. Optional VOA/FLs 1494 and 1496 may be coupled to the first and second outputs of coupler C, respectively, instead of or in addition to VOA/FL 1492. VOA/FL 1492 and/or VOA/FLs 1494 and 1496 may be provided to regulate the optical power of local oscillator LOλ1 to appropriate levels, while maintaining a relatively narrow line width. In FIG. 14c, each of the polarized optical signals in TE WDM and TM WDM (and TE' WDM) may be modulated in accordance with a quadrature phase shift-keying (QPSK) format.

Since the local oscillators, e.g., local oscillator LOλ1, typically output light having a TE polarization, the optical signals in TM WDM, are rotated to have the TE polarization, and the optical signals in TE WDM have the TE polarization without rotation. As a result, each of optical signals (e.g., those in TE WDM, TE' WDM, and the local oscillator outputs) supplied to the optical hybrid circuits OHCs is the same, which as noted above in connection with FIG. 13, may be required for adequate data detection.

Optical hybrid circuitry including MMI couplers 1498 and 1499 receive the demultiplexed outputs from the AWG shown in FIG. 14c as well as the power adjusted outputs of the local oscillator LOλ1, and operate in manner similar to that described above to provide optical signals to photodiodes PD, which, in turn, supply corresponding electrical signals to transimpedance amplifiers TIA. For convenience, the MIMO circuitry is not shown in FIG. 14c.

As further shown in FIG. 14c, heater H1, such as a know thin film heater, may be provided to adjust a temperature, and thus a wavelength of light output from LOλ1. In addition, if VOAs are included in elements 1492, 1494, and 1496, heaters H2, H3, and H4 may be provided in or to adjust the attenuation of such VOAs (i.e., vary the amounts of portions of the input light that are output from the VOAs) in a manner similar to that described below with reference to FIG. 14d. The VOAs may include a forward biased semiconductor optical amplifier or a photodiode, such as a PIN photodiode. In addition, a photodiode BPIN may be provided to sense light output from a back facet of LOλ1 in order to determine the optical power output therefrom. In that case, light output from the front facet of LOλ1 is supplied to isolator ISO, as noted above. The circuitry discussed above (e.g., the AWG, BPIN, local oscillators, VOAs, optical hybrid circuitry, and photodiodes) may be provided on a substrate, such as substrate 110 shown in FIG. 1.

Figure 14D:
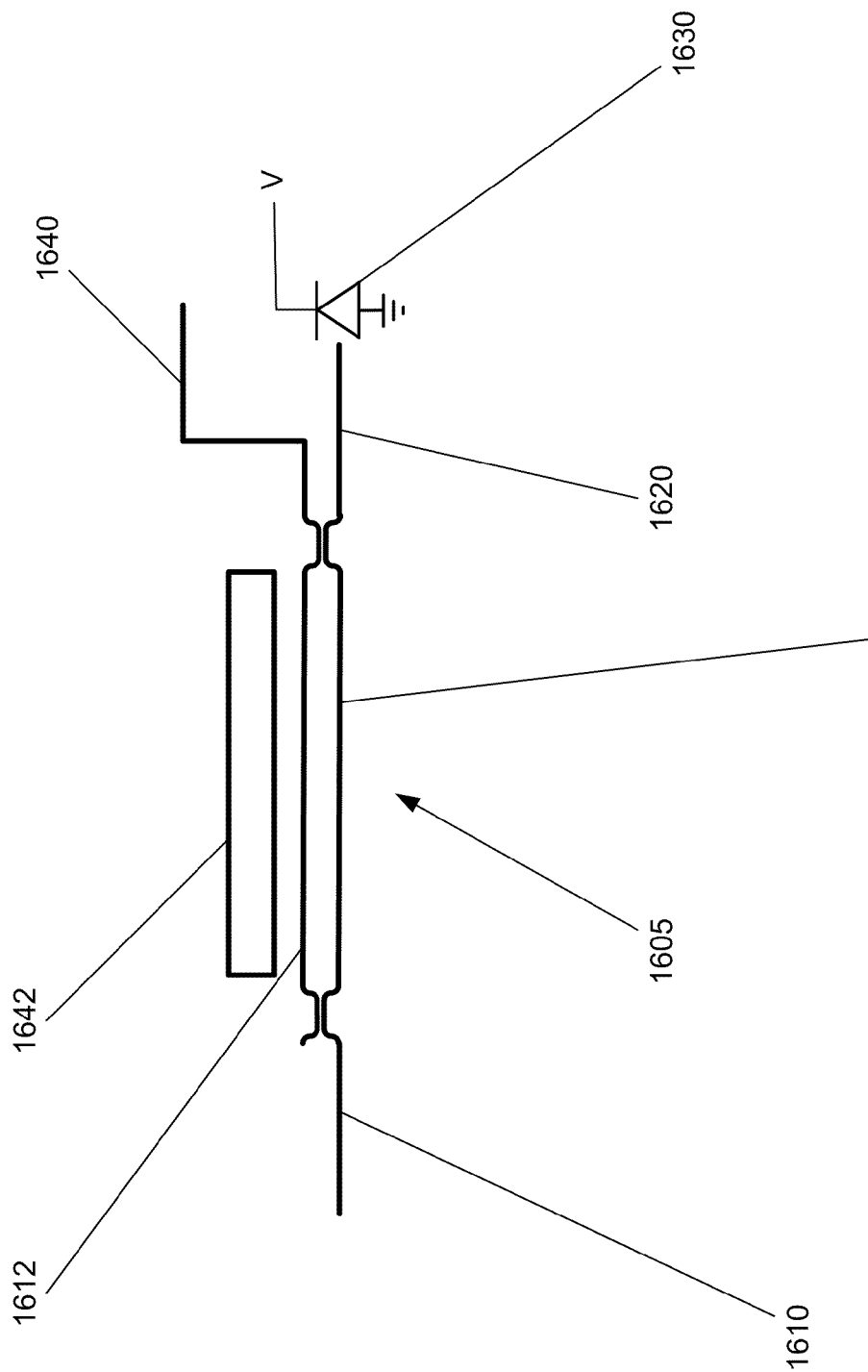

FIG. 14d illustrates an example of a VOA 1605, which may be used as one or more of the VOAs discussed above in connection with FIG. 14c. VOA 1605 is configured as a Mach-Zehnder interferometer in this example, and includes an input waveguide 1610 configured to receive an optical signal, such as the output from local oscillator LOλ1. Input waveguide 1610 supplies such light to a first coupler 1613, which, in turn, feeds a first portion of the optical signal to a first branch waveguide 1612 and a second portion of the optical signal to a second branch waveguide 1614. A second coupler is also provided that is configured to combine first parts of the first and second portions of the optical signal onto a first output waveguide 1640, and second parts of the first and second portions of the optical signal onto a second output waveguide 1620. The first parts constituting a first combined optical signal and the second parts constituting a second combined optical signal. Typically, an optical power associated with the first combined optical signal is greater, and may be substantially greater, than the optical power associated with the second combined signal.

A heater 1642, such as a thin film heater including porous silicon, platinum or other metal or alloy, for example, may also provided that adjust the temperature of the first branch waveguide 1612, for example, in response to an applied bias. As is generally known, changes in temperature in the first branch waveguide 1612 cause changes in the refractive index of this waveguide, which results in changes in phase of the light propagating there through. Accordingly, as generally understood, such phase changes result in variations in the optical power of light supplied to output waveguide 1640.

Although VOA 1605 is configured such that a substantial part of the input signal is output on waveguide 1640, a relatively small part of the input signal may be output on waveguide 1620 due to process variations and/or other non-idealities. Such residual or extraneous light may interfere with light in waveguide 1640, especially if VOA 1605 is integrated on substrate. Accordingly, consistent with an aspect of the present disclosure, photodiode 1630 may be provided to receive and absorb the residual light, thereby minimizing interference with light in waveguide 1640. Photodiode 1630 is preferably biased so that anode 1630-1 is coupled to ground and cathode 1630-2 is coupled to a voltage or potential V. Preferably VOA 1605 is provided on a substrate, such as substrate 110.

Figure 14E:
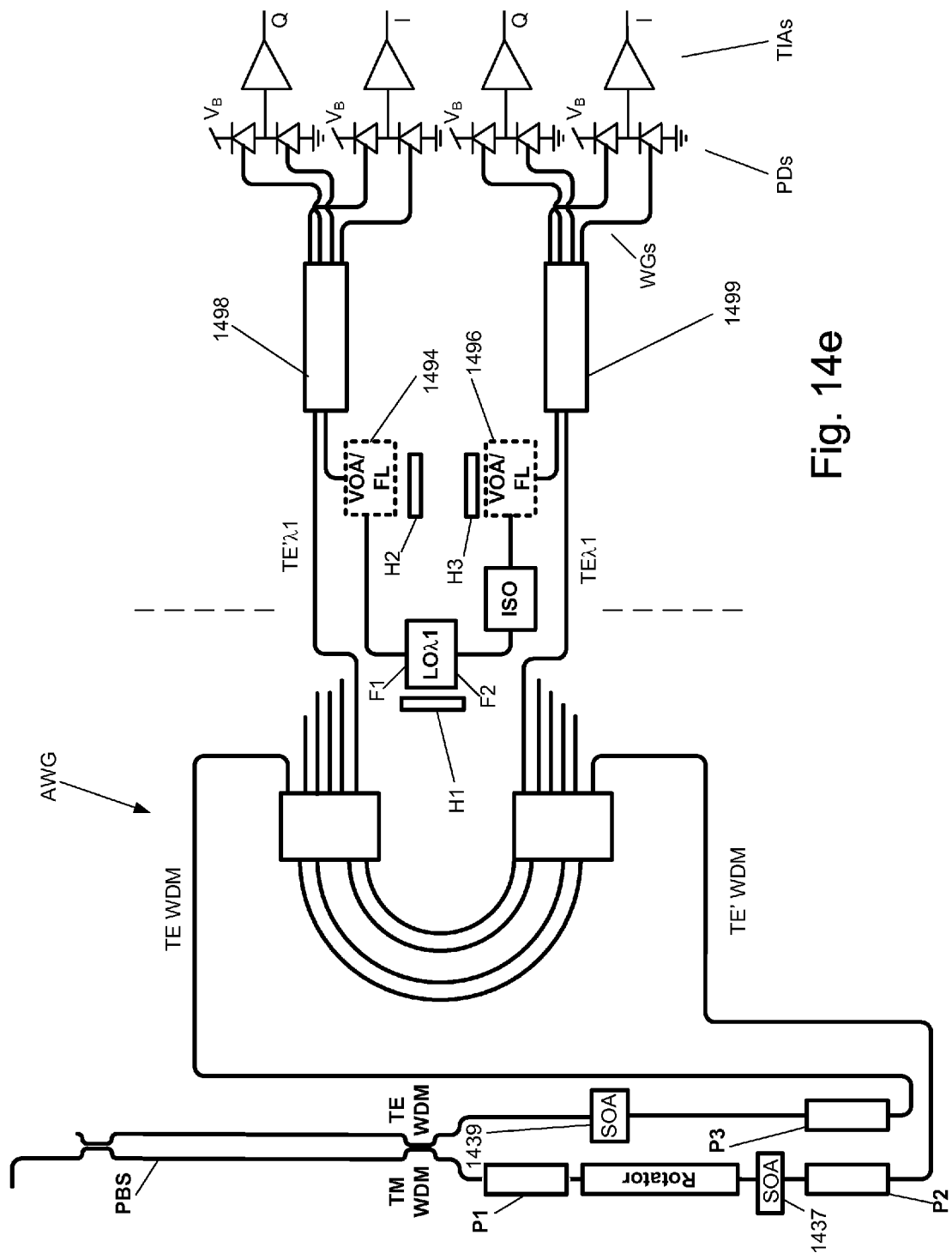

FIG. 14e shows another example of a coherent receiver, in which coupler C and the BPIN photodiode are omitted. Here, LOλ1 includes first and second facets F1 and F2, which light first and second light, respectively. The first light is supplied to VOA/FL 1494 and the second light is supplied, via optical isolator ISO, to VOA/FL 1496. The attenuation of the first and second light may be adjusted or controlled by heaters, e.g., thin film heaters, H2 and H3, respectively. VOA/FL 1494 and VOA/FL 1496 supply power adjusted optical outputs to optical hybrid circuitry including MMI couplers 1498 and 1499 in a manner similar to that discussed above. The operation and structure of the waveguides WG, photodiodes PD, and transimpedance amplifiers TIAs, as well as the polarizers P1, P2, P3, demultiplexer circuitry (AWG), and the polarization beam splitter PBS, is similar to that discussed above. In addition, the circuitry shown in FIG. 14e may be integrated on a common substrate, such as substrate 110. Moreover, it is understood that, as in FIG. 14c, a plurality of local oscillators may be provided, each of which being associated with a corresponding one of the optical signal wavelengths present in TE WDM and T E'WDM. Thus, as in FIG. 14c, the local oscillator, isolator ISO, VOA/FL and MMI, photodiode (PD) and TIA components shown in FIG. 14e may be similarly provided for each optical signal present in TE WDM and TE'WDM that is demultiplexed by the AWG. In addition, each of the polarized optical signals in TE WDM and TM WDM (and TE' WDM) may be modulated in accordance with a QPSK format.

As further shown in FIG. 14e, optional semiconductor optical amplifiers (SOAs) 1437 and 1439 may be provided at the inputs to polarizers P2 and P3. SOAs 1437 and 1439 primarily amplifier TE polarized light. As such, each may be used to suppress or filter any residual TM light that may be present in the output of the rotator and the polarization beam splitter (PBS). In addition, although SOAs 1437 and 1439 may output a relatively small amount of amplified stimulated emission (ASE) light having a TM polarization, such TM ASE light may be filtered by polarizers P2 and P3. It is understood that SOAs 1437 and 1439 may be similarly coupled to polarizers P2 and P3 in FIGS. 14b and 14c.

Figure 15:
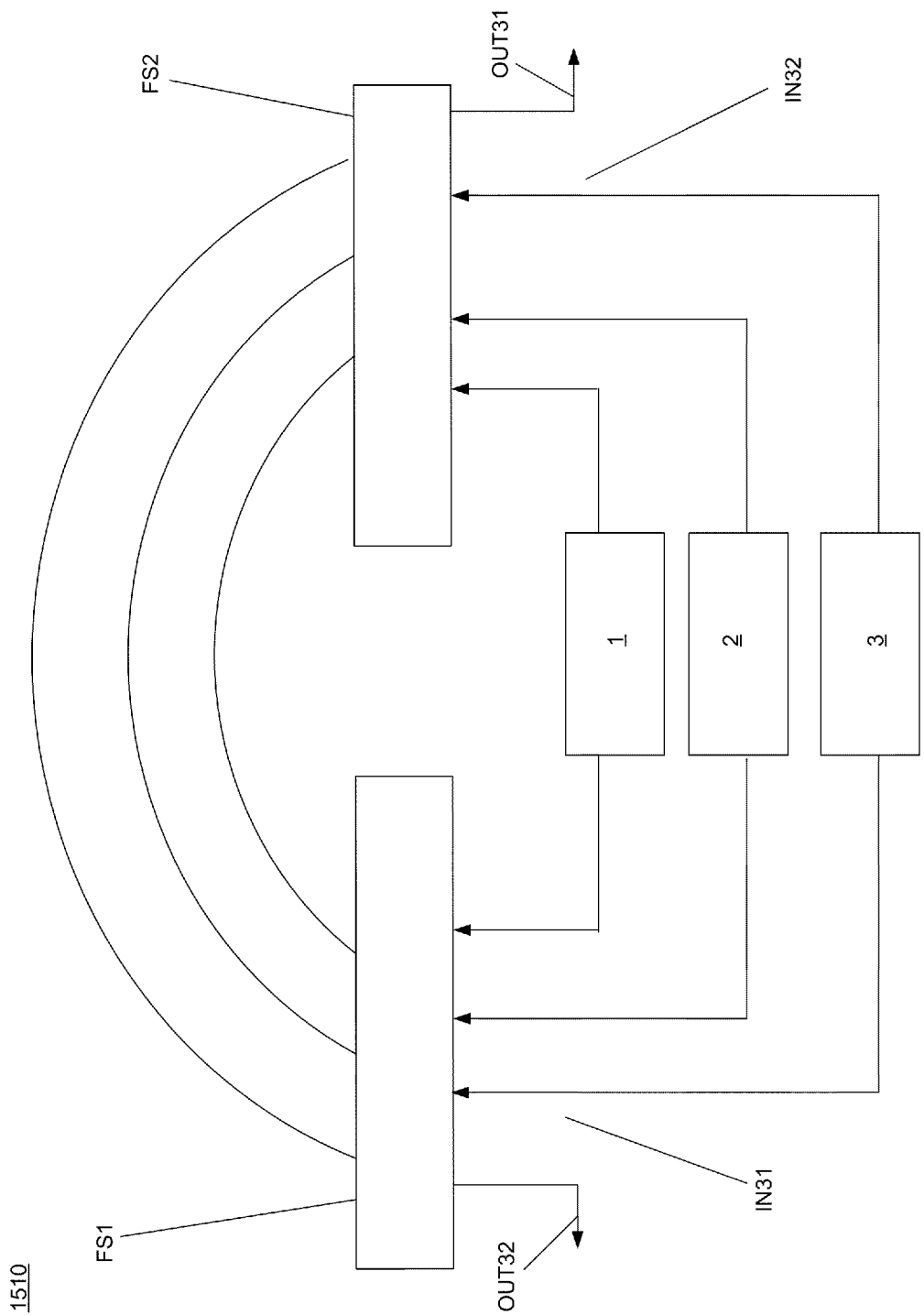
FIG. 15 illustrates an example of an optical multiplexer consistent with the present disclosure.

FIG. 15 shows an example of an AWG 1510, which may be used as a multiplexer at a transmit end of a WDM system. AWG 1510 receives input signals having a first polarization from sources 1-3 at inputs (e.g., input waveguides) IN31 of free space region FS1. The input signals are combined into a WDM signal that is supplied to output waveguide OUT31 coupled to free space region FS2. Similarly, further input signals supplied from sources 1-3 are fed to inputs (e.g., input waveguides) IN32 coupled to free space region FS2, and these signals are combined as another WDM signal supplied from output waveguide OUT32. Preferably, each of the input signals supplied to input waveguides IN31 has a corresponding one of a plurality of wavelengths, but the same polarization, e.g., a TE polarization. In addition, each of the input signals supplied to input waveguides IN32 has a corresponding one of the plurality of wavelengths, but a polarization different than the polarization of optical signals supplied to inputs IN31. For example, each of the signals supplied to input waveguides IN32 may have a TM polarization. Sources 1-3 may have a structure similar to that discussed in U.S. patent application Ser. Nos. 12/345,315 and 12/363,826, the entire contents of both of which are incorporated herein by reference. In particular, each of sources 1-3 may include a laser having first and second facets. The first facet may output a first optical signal that is modulated to carry first information, and the second facet may output a second optical signal that is modulated to carry second information. The first and second optical signals may have the same wavelength.

Receivers consistent with the present disclosure may have a higher RF bandwidth and do not suffer from degradations due to multiple levels of photodiode assembly and wire bonding. In addition, mechanical assembly of a first substrate to a second substrate (e.g. a photonic ligthwave circuit (PLC) to an InP substrate) is unnecessary. Moreover, receivers consistent with the present disclosure may have relatively low RF (radio frequency) noise in the photodiodes (PDs) because fewer wire bonds and leads are required. Further, if provided on an InP substrate, the above-described receivers may be more easily tunable than components provided on a silica based substrate, such as those commonly used to provide a photonic lightwave circuit. In addition, the above-described configurations may be used in both coherent and direct detection receivers, as well with optical signals having various modulation formats, such as DQPSK and QPSK.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
a local oscillator including a laser, the laser supplying light;
an optical splitter configured to receive the light, the optical splitter having a first output configured to supply a first portion of the light and a second output configured to receive a second portion of the light;
optical hybrid circuitry configured to receive the first and second portions of the light from the laser of the local oscillator;
optical demultiplexing circuitry configured to receive a wavelength division multiplexed (WDM) signal including a plurality of optical signals, the optical demultiplexing circuitry further including a plurality of waveguides, each of which supplying a corresponding one of the plurality of optical signals, each of the plurality of optical signals having a corresponding one of a plurality of wavelengths, the optical hybrid circuitry receiving one of the plurality of optical signals from the optical demultiplexing circuitry; and a plurality of photodiodes configured to receive optical outputs from the optical hybrid circuitry, wherein the plurality of optical signals is a first plurality of optical signals, the optical demultiplexing circuitry is further configured to receive a second plurality of optical signals, each of the second plurality of optical signals having a corresponding one of the plurality of wavelengths, said one of the plurality of optical signals being one of the first plurality of optical signals and having one of the plurality of wavelengths, one of the second plurality of optical signals being supplies to the optical hybrid circuitry, said one of the second plurality of optical signals having said one of the plurality of wavelengths.

2. An apparatus in accordance with claim 1, further including a heater, the heater being configured to adjust a temperature of the laser, to thereby adjust a wavelength of the light.

3. An apparatus in accordance with claim 1, further including a variable optical attenuator (VOA) configured to receive the first portion of the light and supply at least a part of the first portion of the light to the optical hybrid circuitry.

4. An apparatus in accordance with claim 3, wherein the VOA is a first VOA, the apparatus further including a second VOA configured to receive the second portion of the light and supply at least a part of the second portion of the light to the optical hybrid circuitry.

5. An apparatus in accordance with claim 3, further including:
  a first heater configured to adjust a temperature of the first VOA; and
  a second heater configured to adjust a temperature of the second VOA.

6. An apparatus in accordance with claim 1, wherein the optical hybrid circuitry includes a multi-mode interference (MMI) coupler.

7. An apparatus in accordance with claim 1, further including a substrate, the local oscillator, the optical hybrid circuitry, optical demultiplexing circuitry, and the plurality of photodiodes being provided on the substrate.

8. An apparatus in accordance with claim 1, wherein the optical demultiplexing circuitry includes an arrayed waveguide grating (AWG).

9. An apparatus in accordance with claim 1, further including an optical isolator configured to receive one of the first and second lights.

10. An apparatus in accordance with claim 3, wherein the VOA includes a forward biased semiconductor optical amplifier.

11. An apparatus in accordance with claim 3, wherein the VOA includes a photodiode.

12. An apparatus in accordance with claim 11, wherein the photodiode is a PIN photodiode.

13. An apparatus in accordance with claim 1, wherein the laser is a photonic bandgap laser.

14. An apparatus in accordance with claim 3, wherein the VOA includes a Mach-Zehnder interferometer.

15. An apparatus in accordance with claim 1, wherein the apparatus includes a plurality of local oscillators, each of which including a corresponding one of a plurality of lasers, each of the plurality of lasers being associated with a corresponding one of the plurality of wavelengths, the local oscillator being one of the plurality of local oscillators.

16. An apparatus in accordance with claim 1, wherein the laser includes a first side and a second side, and said light is first light, which is output from the first side, the apparatus further including a second photodiode configured such that light output from the second side is received by the photodiode.

* * * * *